United States Patent
Nevick et al.

(10) Patent No.: US 10,868,838 B2
(45) Date of Patent: *Dec. 15, 2020

(54) MEDIA DEVICE CONTENT REVIEW AND MANAGEMENT

(71) Applicant: ETURI CORP., San Diego, CA (US)

(72) Inventors: Andrew Nevick, San Diego, CA (US);
Godfrey Duke, San Diego, CA (US);
John Riley, San Diego, CA (US);
Dustin Dailey, San Diego, CA (US)

(73) Assignee: ETURI CORP., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/541,550

(22) Filed: Aug. 15, 2019

(65) Prior Publication Data

US 2020/0021622 A1    Jan. 16, 2020

Related U.S. Application Data

(63) Continuation of application No. 16/203,453, filed on Nov. 28, 2018, now Pat. No. 10,440,063, which is a continuation of application No. 16/032,027, filed on Jul. 10, 2018, now abandoned.

(51) Int. Cl.
| | |
|---|---|
| *G08B 21/02* | (2006.01) |
| *H04L 29/06* | (2006.01) |
| *H04N 21/45* | (2011.01) |
| *H04L 12/58* | (2006.01) |
| *H04W 4/14* | (2009.01) |
| *G11B 20/00* | (2006.01) |

(52) U.S. Cl.
CPC ............ *H04L 63/306* (2013.01); *H04L 51/12* (2013.01); *H04L 63/308* (2013.01); *H04N 21/4532* (2013.01); *G11B 20/00159* (2013.01); *H04W 4/14* (2013.01)

(58) Field of Classification Search
CPC ....................... G08B 21/0202; G06Q 20/35785
See application file for complete search history.

(56) References Cited

U.S. PATENT DOCUMENTS

| | | | |
|---|---|---|---|
| 5,835,722 A | 11/1998 | Bradshaw | |
| 5,949,415 A | 9/1999 | Lin | |

(Continued)

FOREIGN PATENT DOCUMENTS

| | | |
|---|---|---|
| EP | 1090492 | 4/2001 |
| EP | 1271352 | 1/2003 |

(Continued)

OTHER PUBLICATIONS

Blei, David, "Probabilistic Topic Models", Communications of the ACM, vol. 55, dated Apr. 2012, pp. 77-84.

(Continued)

*Primary Examiner* — Arvin Eskandarnia
(74) *Attorney, Agent, or Firm* — Sheppard, Mullin, Richter & Hampton LLP

(57) ABSTRACT

Systems and methods may be provided to monitor media content on a monitored media device, including multimedia content, to determine whether the content is appropriate for the monitored device or devices, and to take action to remove, filter or otherwise block inappropriate content. The content monitored may include, for example, content such as audio content, video content, images, and text.

20 Claims, 14 Drawing Sheets

(56) References Cited

U.S. PATENT DOCUMENTS

| | | | |
|---|---|---|---|
| 5,987,506 A | 11/1999 | Carter | |
| 6,023,507 A | 2/2000 | Wookey | |
| 6,070,190 A | 5/2000 | Reps | |
| 6,195,622 B1 | 2/2001 | Altschuler | |
| 6,233,428 B1 | 5/2001 | Fryer | |
| 6,446,119 B1 | 9/2002 | Olah | |
| 6,691,067 B1 | 2/2004 | Ding | |
| 6,711,474 B1 | 3/2004 | Treyz | |
| 6,721,688 B1 | 4/2004 | Clarke | |
| 6,745,367 B1 | 6/2004 | Bates | |
| 6,754,664 B1 | 6/2004 | Bush | |
| 6,889,169 B2 | 5/2005 | Kirshenbaum | |
| 6,904,168 B1 | 6/2005 | Steinberg | |
| 6,978,303 B1 | 12/2005 | McCreesh | |
| 7,103,215 B2 | 9/2006 | Buzuloiu | |
| 7,185,015 B2 | 2/2007 | Kester | |
| 7,206,845 B2 | 4/2007 | Banning | |
| 7,237,024 B2 | 6/2007 | Toomey | |
| 7,290,278 B2 | 10/2007 | Cahill | |
| 7,383,333 B2 | 6/2008 | Philyaw | |
| 7,490,775 B2 * | 2/2009 | Biderman | H04L 67/1095 725/61 |
| 7,502,797 B2 | 3/2009 | Schran | |
| 7,577,739 B2 | 8/2009 | Donahue | |
| 7,788,365 B1 * | 8/2010 | Foster | H04L 43/00 709/201 |
| 7,797,270 B2 | 9/2010 | Kester | |
| 7,797,411 B1 * | 9/2010 | Guruswamy | G06F 15/173 709/223 |
| 7,814,542 B1 | 10/2010 | Day | |
| 7,846,020 B2 | 12/2010 | Walker | |
| 7,870,189 B2 | 1/2011 | Philyaw | |
| 7,899,862 B2 | 3/2011 | Appelman | |
| 7,904,596 B1 | 3/2011 | Wang | |
| 7,925,780 B2 | 4/2011 | Philyaw | |
| 7,958,234 B2 | 6/2011 | Thomas | |
| 7,979,576 B2 | 7/2011 | Philyaw | |
| 8,010,037 B2 | 8/2011 | Bannwolf | |
| 8,015,174 B2 | 9/2011 | Hubbard | |
| 8,020,209 B2 | 9/2011 | Kester | |
| 8,024,471 B2 | 9/2011 | Sinclair | |
| 8,046,250 B1 | 10/2011 | Cohen | |
| 8,078,724 B2 | 12/2011 | Wang | |
| 8,102,783 B1 * | 1/2012 | Narayanaswamy | H04L 43/18 370/252 |
| 8,141,147 B2 | 3/2012 | Sinclair | |
| 8,150,817 B2 | 4/2012 | Kester | |
| 8,255,950 B1 | 8/2012 | Wick | |
| 8,281,037 B2 | 10/2012 | Julia | |
| 8,281,366 B1 | 10/2012 | McCorkendale | |
| 8,281,382 B1 | 10/2012 | Sanyal | |
| 8,285,249 B2 | 10/2012 | Baker | |
| 8,285,250 B2 | 10/2012 | Rubin | |
| 8,307,068 B2 | 11/2012 | Schuler | |
| 8,839,318 B2 * | 9/2014 | Yao | H04N 21/23418 725/101 |
| 9,075,901 B2 | 7/2015 | Dawson | |
| 2001/0056544 A1 | 12/2001 | Walker | |
| 2002/0094111 A1 | 7/2002 | Puchek | |
| 2002/0099578 A1 | 7/2002 | Eicher | |
| 2002/0146667 A1 | 10/2002 | Dowdell | |
| 2002/0183644 A1 | 12/2002 | Levendowski | |
| 2002/0194008 A1 | 12/2002 | Yang | |
| 2003/0026424 A1 | 2/2003 | McGarrahan | |
| 2003/0074494 A1 | 4/2003 | Rene | |
| 2003/0086422 A1 * | 5/2003 | Klinker | H04L 29/06 370/389 |
| 2003/0221118 A1 | 11/2003 | Walker | |
| 2004/0015579 A1 * | 1/2004 | Cooper | H04L 41/046 709/223 |
| 2004/0158631 A1 | 8/2004 | Chang | |
| 2005/0068961 A1 | 3/2005 | Raghunath | |
| 2006/0025282 A1 | 2/2006 | Redmann | |
| 2006/0052909 A1 | 3/2006 | Cherouny | |
| 2007/0077933 A1 * | 4/2007 | El-Sayed | H04W 24/02 455/446 |
| 2007/0220144 A1 | 9/2007 | Lovell | |
| 2007/0234380 A1 | 10/2007 | Sahasrabudhe | |
| 2008/0080691 A1 | 4/2008 | Dolan | |
| 2008/0229233 A1 | 9/2008 | Blattner | |
| 2009/0003227 A1 * | 1/2009 | Malomsoky | H04L 29/06027 370/252 |
| 2009/0174566 A1 | 7/2009 | Volk | |
| 2009/0327179 A1 | 12/2009 | Strassner | |
| 2010/0048272 A1 | 2/2010 | Koh | |
| 2010/0191561 A1 | 7/2010 | Jeng | |
| 2010/0216509 A1 | 8/2010 | Riemer | |
| 2010/0263055 A1 | 10/2010 | Habif | |
| 2010/0318642 A1 | 12/2010 | Dozier | |
| 2011/0046519 A1 | 2/2011 | Raheman | |
| 2011/0047287 A1 * | 2/2011 | Harrang | H04L 47/24 709/235 |
| 2011/0078767 A1 | 3/2011 | Cai et al. | |
| 2011/0082946 A1 | 4/2011 | Gopalakrishnan | |
| 2011/0202555 A1 | 8/2011 | Cordover | |
| 2012/0000011 A1 | 1/2012 | Grewall | |
| 2012/0011105 A1 | 1/2012 | Brock | |
| 2012/0034946 A1 | 2/2012 | Skalicky | |
| 2012/0108200 A1 | 5/2012 | Rubin | |
| 2012/0122066 A1 | 5/2012 | Dohring | |
| 2012/0130770 A1 | 5/2012 | Heffernan | |
| 2012/0143694 A1 | 6/2012 | Zargahi | |
| 2012/0202555 A1 | 8/2012 | Bergman | |
| 2012/0215328 A1 | 8/2012 | Schmelzer | |
| 2012/0237908 A1 | 9/2012 | Fitzgerald | |
| 2012/0239173 A1 | 9/2012 | Laikari | |
| 2012/0244879 A1 | 9/2012 | Freathy | |
| 2012/0250646 A1 | 10/2012 | Rubin | |
| 2012/0290950 A1 | 11/2012 | Rapaport | |
| 2012/0331113 A1 | 12/2012 | Jain | |
| 2013/0012160 A1 | 1/2013 | Rubin | |
| 2013/0013130 A1 | 1/2013 | Emam | |
| 2013/0065555 A1 | 3/2013 | Baker | |
| 2013/0067070 A1 | 3/2013 | Rowe | |
| 2013/0225151 A1 | 8/2013 | King | |
| 2013/0276055 A1 | 10/2013 | Jacobson | |
| 2013/0305158 A1 | 11/2013 | Vasquez | |
| 2013/0318005 A1 | 11/2013 | Bass | |
| 2014/0012878 A1 | 1/2014 | Moussavian | |
| 2014/0012977 A1 | 1/2014 | Moussavian | |
| 2014/0024339 A1 | 1/2014 | Dabbiere | |
| 2014/0032023 A1 | 1/2014 | Kumar | |
| 2014/0038546 A1 | 2/2014 | Neal | |
| 2014/0255889 A1 | 9/2014 | Grimes | |
| 2014/0272894 A1 | 9/2014 | Grimes | |
| 2014/0344718 A1 | 11/2014 | Rapaport | |
| 2015/0245095 A1 * | 8/2015 | Gonzalez | H04N 21/4751 725/28 |
| 2015/0341812 A1 * | 11/2015 | Dion | H04W 24/08 370/252 |
| 2016/0306950 A1 * | 10/2016 | Schuman | H04N 21/41407 |

FOREIGN PATENT DOCUMENTS

| | | |
|---|---|---|
| EP | 1376981 | 1/2004 |
| EP | 2239679 | 10/2010 |
| RU | 2326439 | 6/2008 |
| WO | WO0198936 | 12/2001 |
| WO | WO2002025415 | 3/2002 |
| WO | WO2009059199 | 5/2009 |
| WO | WO2010051455 | 5/2010 |
| WO | WO2010102265 | 10/2010 |
| WO | WO2011061412 | 5/2011 |

OTHER PUBLICATIONS

Bradley, M.M., & Lang, P.J. (1999). Affective norms for English words (ANEW): Instruction manual and affective ratings. Technical Report C-1, The Center for Research in Psychophysiology, University of Florida (49 pages).

(56) References Cited

OTHER PUBLICATIONS

European Search Report received in 13816695.4 dated Feb. 11, 2016 (7 pages).
Extended European Search Report received in 13816695.4 dated May 20, 2016 (13 pages).
Extended European Search Report received in 13816695.4, dated May 16, 2016, 13 pages.
International Preliminary Report on Patentability filed in PCT/US2015/021794, dated Oct. 6, 2016, 7 pages.
International Search Report and Written Opinion for PCT/US17/42903 dated Nov. 9, 2017.
International Search Report and Written Opinion for PCT/US17/52112 dated Nov. 17, 2017, 14 pages.
International Search Report for PCT/US2015/021794, dated Jul. 2, 2015, 8 pages.
International Search Report issued for PCT/US2013/049806, dated Nov. 7, 2013, 7 pages.
International Search Report issued for PCT/US2013/049809, dated Nov. 7, 2013, 7 pages.
International Search Report issued for PCT/US2013/049809, dated Oct. 31, 2013, 7 pages.
International Search Report issued for PCT/US2013/049813, dated Oct. 24, 2013, 7 pages.
International Search Report issued for PCT/US2017/42898, dated Nov. 9, 2017, 7 pages.
International Search Report issued for PCT/US2017/52112, dated Nov. 17, 2017, 13 pages.
Kamps, Haje, Jan, "Flipd app forces you to put your iPhone away so you can get some work done," published Mar. 31, 2016, AOL, Inc. (7 pages).
Karlsson, Magnus et al. "Triage: Performance Isolation and Differentiation for Storage Systems", Mar. 10, 2004, 24 pages.
Supplementary European Search Report filed in EP15769201.3, dated Sep. 28, 2017, 9 pages.

* cited by examiner

MEDIA DEVICE CONTENT REVIEW AND MANAGEMENT

CROSS-REFERENCE TO RELATED APPLICATIONS

This application is a continuation of U.S. patent application Ser. No. 16/203,453 filed on Nov. 28, 2018, which claims priority to U.S. patent application Ser. No. 16/032,027 filed on Jul. 10, 2018, which are both incorporated herein by reference in their entirety.

TECHNICAL FIELD

The disclosed technology relates generally to content monitoring. Some embodiments relate to content monitoring systems and methods for electronic devices.

DESCRIPTION OF THE RELATED ART

The advent of smart phone and tablet technology has ushered in an era of connectivity and content sharing that fundamentally changed the way people conduct their lives. These portable content devices are ubiquitous in today's society and they have become a way of life for most people in modern communities. The growth and accessibility of portable connectivity has arguably also led to an increase in content sharing and other like applications used in other devices as well, such as in desktop and laptop computing devices, for example.

Recent years have experienced an explosion of content sharing opportunities among users of electronic devices. Social media applications, gaming applications, video sharing applications, and messaging applications, are examples of just a few of the many content sharing opportunities available to users of all ages. The types of content available to users of such devices are seemingly limitless, from educational to commercial to entertainment, and everything in between. While the ready availability of vast amounts of varying content can offer tremendous opportunities for increased productivity, knowledge growth and other benefits, if unchecked it can also lead to adverse consequences. For example, the availability of games and other forms of entertainment may distract the student from completing his or her homework assignments; it may also distract an employee from attending to his or her job duties. As another example, content deemed to be unsuitable for impressionable youth may be accessible to these youth if unmonitored.

BRIEF SUMMARY OF EMBODIMENTS

According to various embodiments of the disclosed technology, devices and methods for providing content monitoring for one or more devices to be monitored. More particularly, in some applications, systems and methods are provided to monitor media content, including multimedia content, to determine whether the content is appropriate for the users associated with the monitored device or devices, and to take action to remove, filter or otherwise block inappropriate content. The content monitored may include, for example, content such as audio content, video content, images, and text.

A system for device monitoring may include: an electronic monitored device that may include a communications transceiver a monitoring and analysis circuit, wherein the monitoring and analysis circuit monitors device media content received, sent or generated by the electronic monitored device, analyzes the monitored media content and identifies any monitored media content that exceeds a content tolerance level established for that device as flagged content; generates derived data for the flagged content; and causes the flagged content and its corresponding derived data to be transmitted to a server a server, may include a server analysis component; wherein the server stores the media content tolerance level established for the monitored device analyzes derived data using the server analysis component to determine if the flagged content corresponding to the derived data exceeds the media content tolerance level for the monitored device; and generates an alert if it the flagged content may be determined by the server analysis component to exceed the media content tolerance level for the monitored device; and an electronic monitoring device, wherein the electronic monitoring device receives the alert generated by the server for the flagged content; receives the flagged content associated with the alert; and displays the received flagged content to a user of the electronic monitoring device.

In one embodiment, the monitoring and analysis circuit may be located in the monitored device or the monitoring and analysis circuit may be located in a router connected to the monitored device.

In one embodiment, the monitoring and analysis circuit causes the monitored device to transmit the flagged content to the server and the monitored device encrypts the flagged content prior to transmission and transmits encrypted flagged content to the server. In another embodiment, the monitoring and analysis circuit causes the router to transmit the flagged content to the server and further wherein the router encrypts the flagged content prior to transmission and transmits encrypted flagged content to the server. The server may be unable to decrypt the encrypted flagged content sent from the monitored device or the router to the server. In some embodiments, for example, the server might not be provided the encryption keys or other data or information necessary to decrypt the encrypted flagged content.

The monitoring device may decrypt the encrypted flagged content prior to displaying the flagged content to the user.

The media content may include at least one of the display output of the monitored device, text input of the monitored device and audio input of the monitored device. Content tolerance levels may include a threshold probability that the monitored media content contains inappropriate content from one or more categories of inappropriate content. The derived data may include data to determine a probability that the captured media content contains inappropriate content. In one embodiment, the derived data may include text extracted from the captured media content. In one embodiment, the derived data may include an identification of third parties associated with the flagged media content.

In one embodiment, monitoring and analysis circuit may employ at least one of optical character recognition, image recognition, image classification, text recognition, voice recognition, speech recognition, and pattern recognition to monitor the media content.

In one embodiment, the server analysis component determines that the flagged media content exceeds a tolerance level if a probability indicated by the derived data that the flagged media content contains inappropriate content exceeds a threshold probability set by the media content permission setting that the captured media content contains inappropriate content from one or more categories of inappropriate content.

The monitoring device may accept feedback from the user of the monitoring device, the feedback may include an indication from the user whether or not the flagged content displayed to the user constitutes inappropriate material according to standards of the user. In one embodiment, the feedback may include at least one of: an indication as to whether the flagged media content should have been determined by the server analysis component to constitute inappropriate material an indication as to the extent to which the flagged media content contains inappropriate content from one or more categories of inappropriate content; a textual input describing characteristics of the captured media content; and a textual input reciting text information contained in the captured media content. The feedback data received by the monitoring device may be used to train at least one of a machine learning algorithm used by the local analysis component and a machine learning algorithm used by the monitoring and analysis circuit.

At least one of the server and the monitoring device may remotely restrict the functionality of the monitored device, or report or flag the occurrence of the violation, if the server analysis component determines that the flagged media content violates a content tolerance level.

A method for monitoring a device, may include the steps: monitoring media content generated by, sent by or sent to an electronic monitored device generating derived data of the monitored media content with a monitored device local analysis component; analyzing the derived data with a server analysis component to determine if the monitored media content exceeds a content threshold level setting for the monitored device; generating an alert if it the monitored media content may be determined to exceed the content threshold level setting; receiving the alert on an electronic monitoring device; and viewing the monitored device media content on the monitoring device.

In one embodiment, the system may further include the monitoring device accepting feedback from the user of the monitoring device, the feedback may include an indication from the user whether or not the flagged content displayed to the user constitutes inappropriate material according to standards of the user.

In one embodiment, the feedback comprises at least one of: an indication as to whether the flagged media content should have been determined by the server analysis component to constitute inappropriate material an indication as to the extent to which the flagged media content contains inappropriate content from one or more categories of inappropriate content; a textual input describing characteristics of the captured media content; and a textual input reciting text information contained in the captured media content.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

Figure 1:
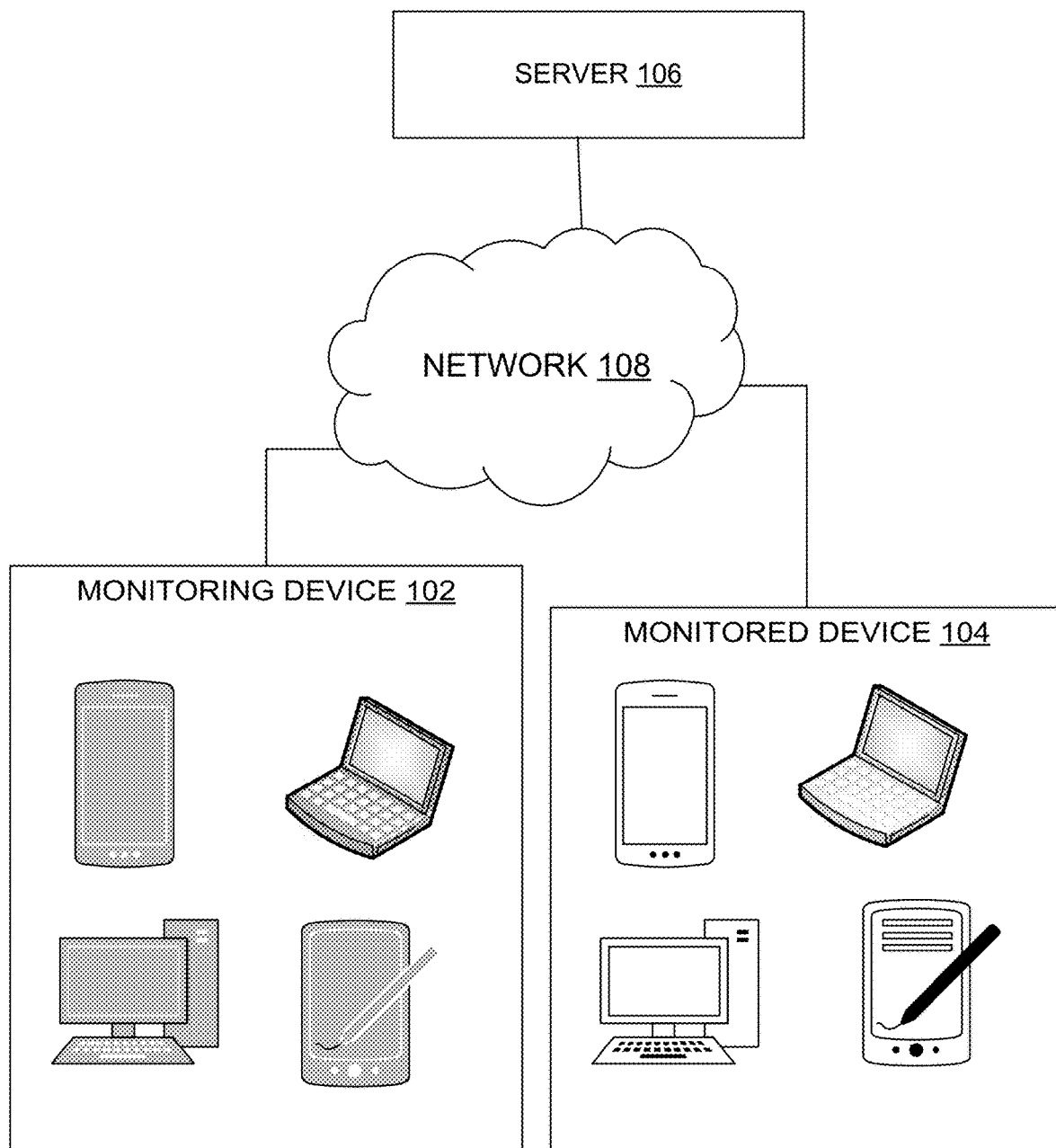
FIG. 1 illustrates an example of a content monitoring system in accordance with one embodiment.

The figures are not intended to be exhaustive or to limit the invention to the precise form disclosed. It should be understood that the invention can be practiced with modification and alteration, and that the disclosed technology be limited only by the claims and the equivalents thereof.

DETAILED DESCRIPTION OF THE EMBODIMENTS

Embodiments of the technology disclosed herein are directed toward devices and methods for providing content monitoring for one or more devices to be monitored. More particularly, in some applications, systems and methods are provided to monitor media content, including multimedia content, to determine whether the content is appropriate for the monitored device or devices, and to take action to remove, filter or otherwise block inappropriate content. The content monitored may include, for example, content such as audio content, video content, images, and text.

For example, in some implementations content generated by, received by, or otherwise present on a monitored device can be reviewed to determine whether the content is appropriate according to a defined appropriateness standard for that device or its user. The content can be tested, and if potentially inappropriate content is detected on the monitored device, information pertinent to the potentially inappropriate content may be sent to a server for further evaluation. This information may include, for example, the potentially inappropriate content itself or portions thereof, and derived data corresponding to the content and its potential inappropriateness. The server may analyze the information to determine whether the content is inappropriate. If so, the server may generate an alert to a monitoring device. The monitoring device may be given permission to review the potentially inappropriate content that caused the alert and make a final determination as to whether or not the potentially inappropriate content is indeed inappropriate. If the monitoring device determines that the content is indeed inappropriate, actions can be taken to restrict the monitored device from receiving this content. For example, the content can be removed from the monitored device, or it can be blocked or disabled such that the user of the monitored device cannot access or view the content. As another example, the source of the inappropriate content can be identified (e.g., by an IP address, email address, SMS or MMS address, and so on) and that sender blocked from sending further content to the monitored device.

In various embodiments, the monitoring device may also generate feedback about the content which can be used to update the analysis mechanisms used by the server and the local analysis mechanisms used by the monitored device to evaluate content. For example, a user of the monitoring device may determine that the flagged content is not really inappropriate according to his or her standards, or that it was flagged in error, and this feedback can be used to adjust the algorithms used to flag content as potentially inappropriate. In various implementations, AI and machine learning techniques can be used to update the analysis mechanisms used by the various devices to refine the decision-making process for flagging content as potentially inappropriate according to the reviewer's standards for inappropriateness.

Before describing further embodiments in greater detail, it is useful to provide a high-level description of embodiments of the systems and methods disclosed herein. FIG. 1 illustrates an example of a content monitoring system in accordance with one embodiment. More particularly, FIG. 1 illustrates an example of a monitoring device 102 that is monitoring a monitored device 104 through the use of a monitoring server 106. Devices monitored can include, for example, smart phones, tablets, media players, computers (desktops, laptops, etc.), automobile head units, workstations, and other content devices. Likewise, monitoring devices 102 may include, for example, smart phones, tablets, media players, computers (desktops, laptops, etc.), workstations and other processing devices. Server 106 may include a computing platform configured to provide monitoring of content and sharing of content between monitoring devices 102 and monitored devices 104.

As also illustrated in FIG. 1, monitoring devices 102, monitored devices 104 and servers 106 may communicate with one another using one or more communication networks 108. For example, the devices may connect via one or more communication platforms such as Bluetooth, IEEE 802.11 (e.g., WiFi), Ethernet, Internet, cellular data networks (e.g., 3G, 4G, 5G, etc.), or other communications networks. As described in example embodiments presented below, information exchanged via communication networks 108 may include monitored content, content flagged as potentially inappropriate, data relating to the content, and other communications between or among monitoring devices 102, monitored devices 104 and servers 106.

Although not illustrated in FIG. 1, in some applications a monitoring device 102 and a monitored device 104 can be the same device. For example, in one-device households, the single device may be shared amongst various family members. These family members sharing the device might include parents and children who each share the household device. Device sharing such as this is not limited to 1-device households, but even households with multiple devices may share one or more of media devices between a parent and a child, or among multiple parents and children. These scenarios are not limited to a household, but can also apply in other environments where one or more devices are shared by supervisors and supervisees.

Accordingly, embodiments can be implemented in which supervisor functions such as those described herein can be implemented on the same device as the supervisee functions. In such embodiments, content monitoring, feedback and control can be managed using, for example, user IDs, login information, or other user identification information. Likewise, access to control and feedback functions can be limited to supervisors or other authorized users using similar user identification/authentication information.

Before describing embodiments in more detail, it is useful to describe a few example applications for the systems and methods disclosed herein. For instance, in one scenario the system may be configured such that a parent or guardian may use a monitoring device (e.g., monitoring device 102) to monitor and control content (e.g., text, images, videos or other content) on their child's or children's device or devices (e.g. monitored device 104). In another application, an employer may use a monitoring device to monitor and control content on the devices of its employees. As yet another example, a teacher or school administrator may use a monitoring device to monitor and control content on the devices of students. For ease of discussion, parents, bosses, employers, teachers, administrators, or other persons using a monitoring device or devices to monitor another device may be referred to herein as a supervisor. Similarly, children, workers or employees, contractors, students or other persons subject to content monitoring on a monitored device or devices may be referred to herein as a supervisee. This terminology is not intended to imply or require a boss/employee relationship, but is merely adopted to provide an efficient way to describe persons who are monitoring the content accessed or used by another, and those persons whose content access or other use is being monitored.

Figure 2:
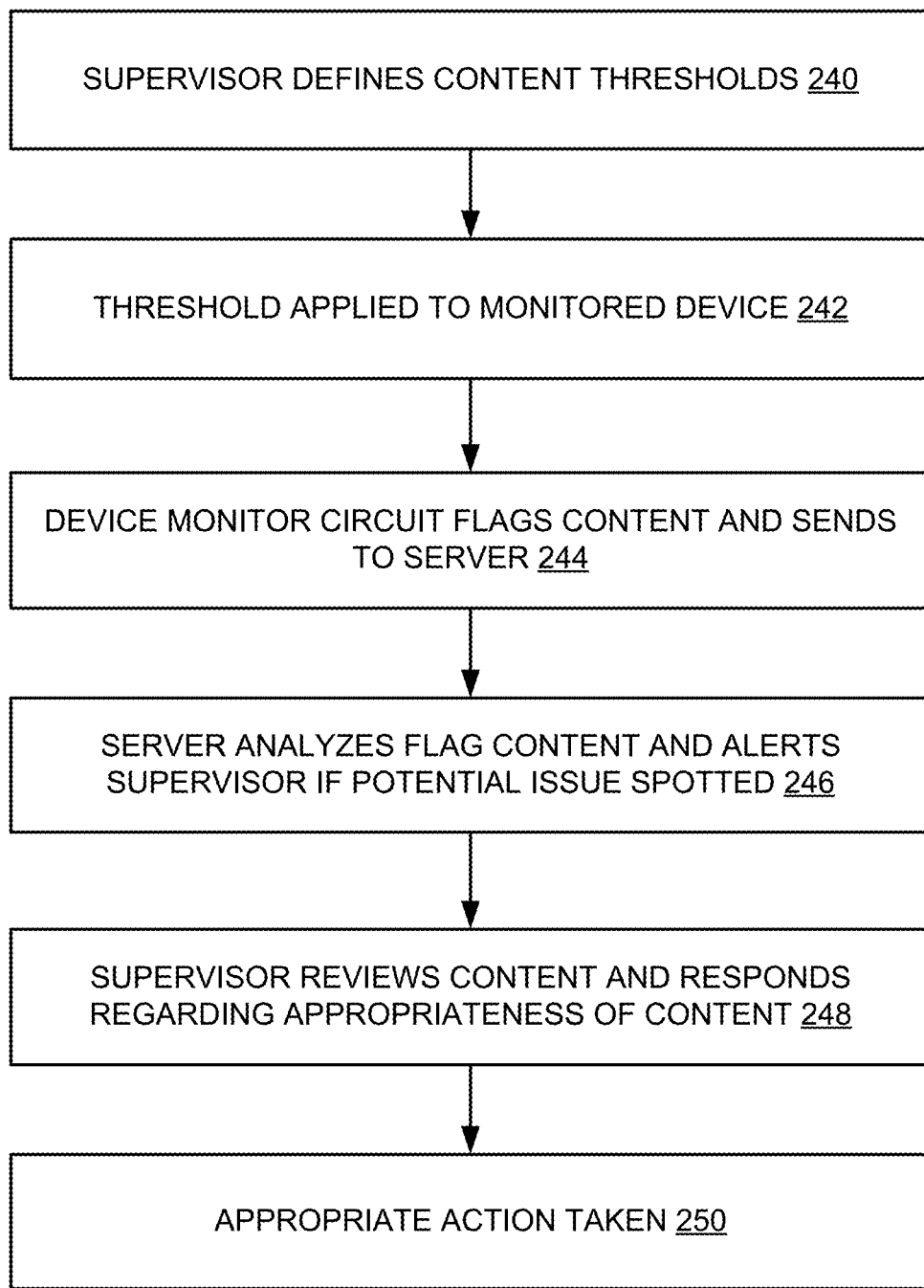
FIG. 2 illustrates an example process for content monitoring in accordance with one embodiment of the systems and methods disclosed herein.

FIG. 2 illustrates an example process for content monitoring in accordance with one embodiment of the systems and methods disclosed herein. This process is described in terms of an example scenario in which a supervisor (e.g., parent, employer, teacher, etc.) uses a content monitoring system to monitor content on the device of a supervisee (e.g., child, employee, student, etc.). Referring now to FIG. 2, at operation 240, the supervisor defines one or more thresholds for inappropriateness of content on the supervisee's device. For example, the supervisor can define thresholds for content characteristics such as, for example, violence, nudity, illicit content, profanity, gaming/entertainment, other subject matter, or other content criteria. Additional examples of inappropriateness thresholds are provided below. Accordingly, whether content is inappropriate or not can be as defined by one or more supervisors for one or more supervisees. As discussed below, this level can be adjusted or refined using feedback gathered from the one or more supervisors. In other embodiments, whether content is inappropriate can be predefined, and this predefined threshold can be further refined or adjusted based on feedback or based on user (e.g., supervisor) preferences.

At operation 242, the selected tolerance thresholds are set on the supervisee's monitored device. In some implementations, monitored devices can have more than one tolerance threshold or set of tolerance thresholds. For example, a monitored device that supports multiple users may have different tolerance thresholds set for the different user supported by that device. These thresholds could be stored on the device and implemented operationally based on user login, for example. As another example, a monitored device may have different thresholds for a user that very based on external factors such as, for example, location of the device, day and time of day (e.g., during school or afterschool), and so on. As yet another example, a monitored device may have different tolerance levels that can be activated remotely by a monitoring device or locally via a password-protected interface. In some embodiments, the tolerance levels can be stored on the monitored device for local analysis of content at the monitored device. The media content tolerance settings can define the relationship between the monitored device and the monitoring device that establish those tolerance levels for the monitored device.

At operation 244, the monitored device captures media content, analyzes the captured content for comparison against the tolerance thresholds and generates data about the captured content. The content monitored and analyzed can include, for example, audio data, text data, image data (still or video), input from a camera, speech, or other content. The monitored device sends the content and the captured data to the content monitoring server for further analysis. In some embodiments, the content can be encrypted before sending it to the server.

At operation 246, the server analyzes the data and determines whether the content is likely inappropriate based on the thresholds established for the monitored device. In embodiments where the content itself is encrypted such that the server cannot access the content, the server determines the probability that the content violates a tolerance threshold based on the derived data for that content. If the content appears to violate a threshold based on this analysis, the server can generate an alert and send that alert to the monitoring device indicating the discovery of potentially inappropriate content on the monitored device. The alert may include, for example, a digital notification, text message, email, or other message or communication to trigger an alert or notification on the monitoring device. In various embodiments, the server can store the content and its corresponding derived data, and can further provide the derived data and the content to the monitoring device. The server may be implemented as a cloud-based server or distributed server, or can be a server at a particular facility.

At operation 248, the monitoring device receives the alert. The supervising device may retrieve the associated content from the server and the supervisor may review the content him or herself to determine whether it is inappropriate based on the standards of the supervisor. The supervisor may then respond to the server with feedback indicating whether the supervisor has determined the content to indeed be inappropriate.

At operation 250, appropriate action can be taken vis-à-vis any content determined to be inappropriate. For example, one or more actions can be taken such as, for example, deleting the inappropriate content, blocking communication with the source/destination of the inappropriate content, disabling the application or other instrumentality running the inappropriate content (e.g., MMS service, video player, audio player, etc.), disabling the monitored device itself, and so on. In some embodiments, these action can be taken automatically, or user input may be required before any action is initiated in response to the inappropriate content.

For example, a settings menu can include the appropriate options to allow the supervisor to choose whether to enable automatic action were content is determined to be inappropriate or to require supervisor input before action is taken. A menu may also allow a supervisor to elect the type of action taken. Actions may include one or more of, for example, removing inappropriate content from the device, blocking senders or recipients of the inappropriate content from communicating with the device, blocking the content itself, shutting down or disabling the device, shutting down or disabling the application on which the offending content occurs, shutting down or disabling communication with the device, warning the supervisee about the offensive content, and other actions as may be appropriate to address the supervisee's handling of inappropriate content.

Figure 3:
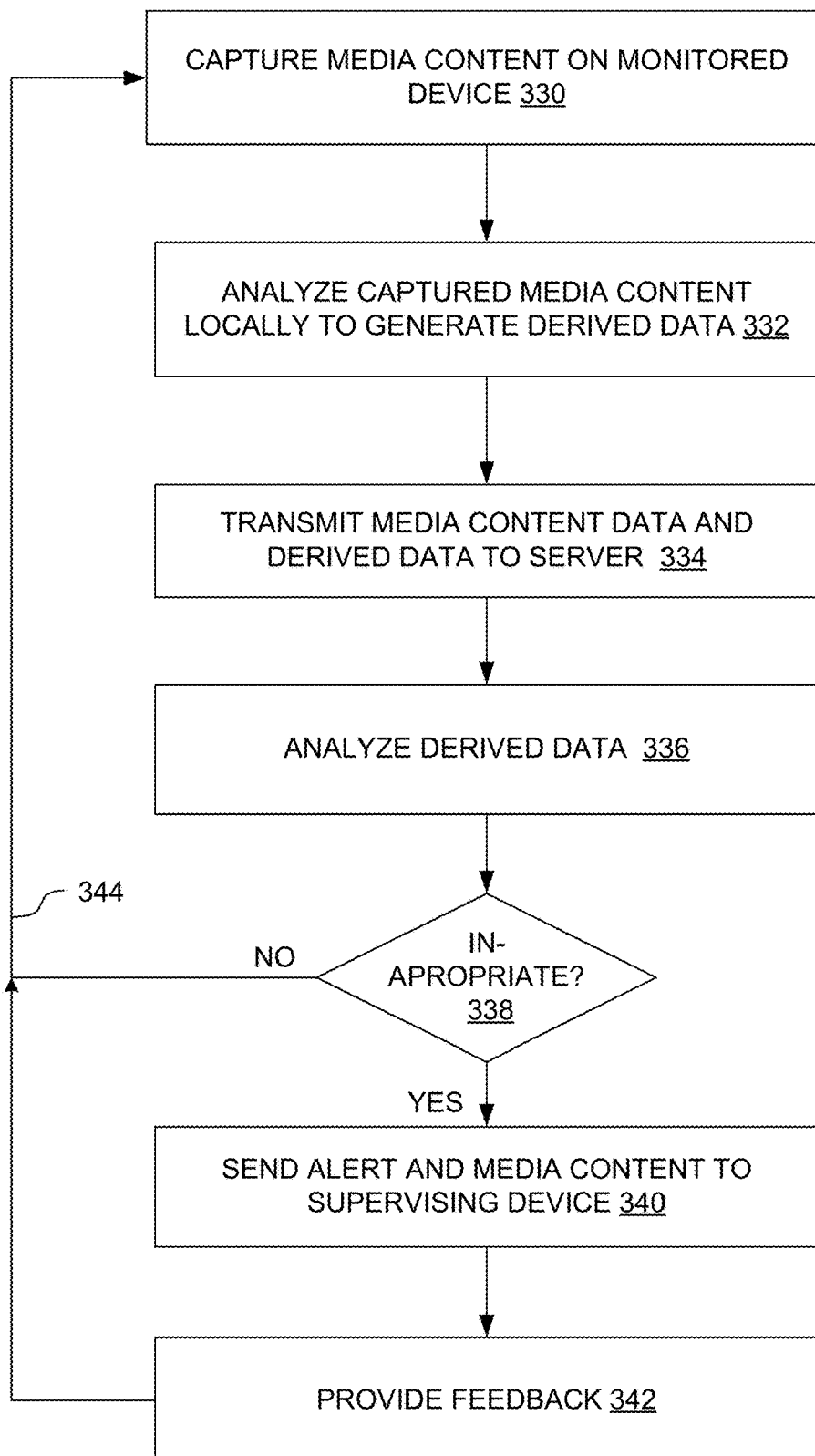
FIG. 3 illustrates another example process for content monitoring in accordance with one embodiment of the systems and methods disclosed herein.
Figure 4:
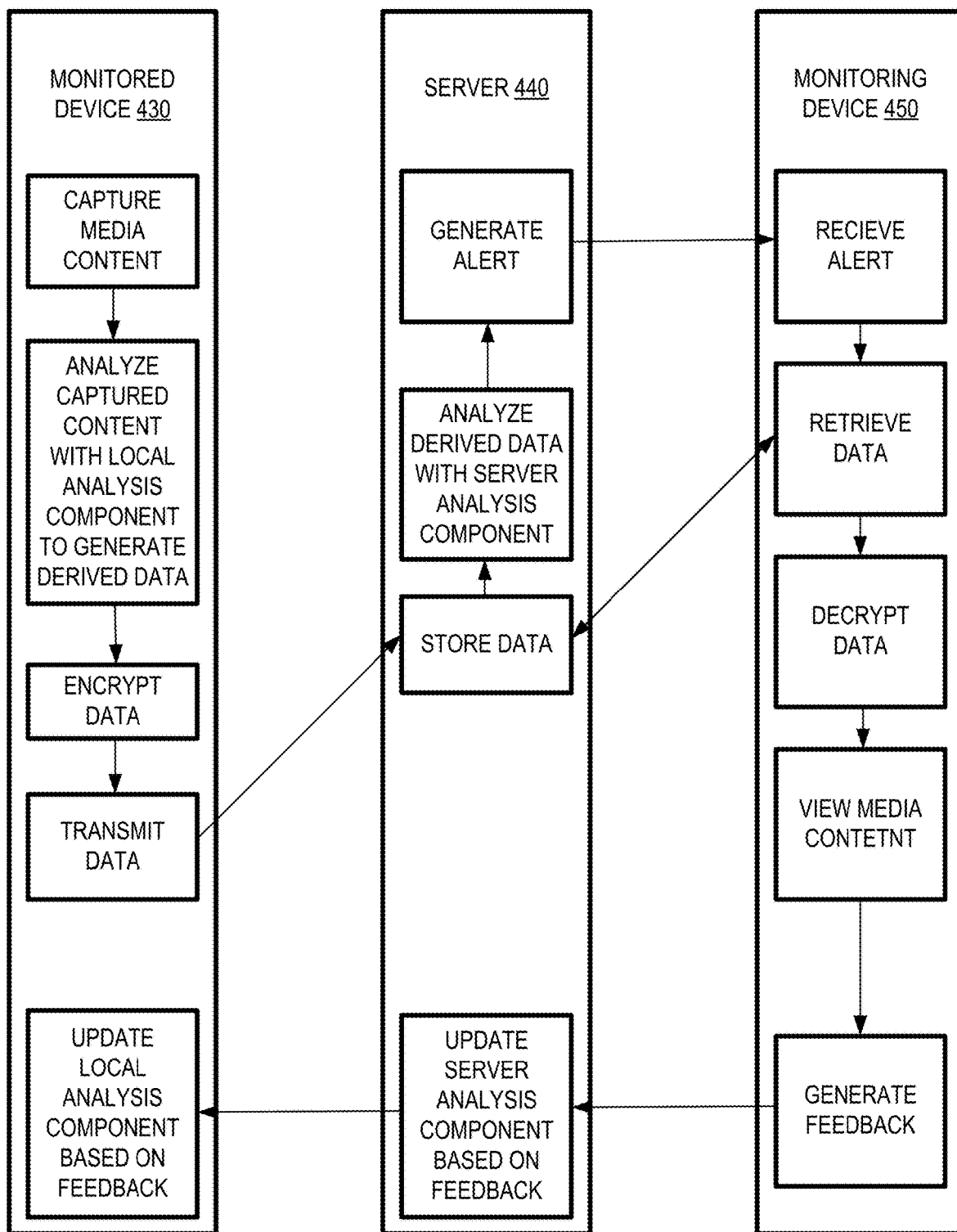
FIG. 4 illustrates an example data flow of the example embodiment illustrated in FIG. 3.

FIG. 3 illustrates another example process for content monitoring in accordance with one embodiment of the systems and methods disclosed herein. FIG. 4 illustrates an example data flow of the example embodiment illustrated in FIG. 3. This example is described in terms of an implementation in which a server 440 is used to facilitate content monitoring of a monitored device 430 by a monitoring device 450.

Referring now to FIGS. 3 and 4, at operation 330, media content on monitored device 430 is captured. The content can be captured as it is entering monitored device 430. For example, in the case of a device with communications capability such as a smart phone, tablet or other like device, incoming messages such as emails, SMS messages, MMS messages, IM messages, can be monitored. As another example, downloaded or streaming content such as content received through an Internet, ethernet, USB, cellular data, Wi-Fi, Bluetooth or other connection can also be monitored. As yet a further example, text being entered by a user (e.g., via keyboard, speech recognition, or other input mechanism), pictures uploaded by user or other content introduced to the device can be monitored. In addition to or instead of capturing content as it enters monitored device 430, content stored in memory of monitored device for 30 can also be captured for analysis.

At operation 332, the captured content is analyzed with a local analysis component to determine whether any of the monitored content includes potentially inappropriate content. In some implementations, this content monitoring and analysis can be performed by a monitoring and analysis circuit included on monitored device 430. The local analysis can include, for example, analyzing captured media content using tools such as text recognition tools, OCR tools, image and pattern recognition tools, image classification tools, voice and speech recognition tools, and so on. The text, image, speech and other forms of content can be reviewed to determine whether the content violates the tolerance levels established for the monitored device. For example, the presence of profane or illicit language in text messages, email messages or speech may cause the content to be flagged as inappropriate. As another example, pattern or image recognition may be used to identify sexual content, nudity or violence.

The monitoring and analysis circuit can be configured or programmed with various threshold settings for flagging content as potentially inappropriate. For example, text comparison recognition, textual and contextual analysis, image and pattern recognition, and other analysis tools can be used to determine content that may potentially be inappropriate. Data regarding the potentially inappropriate content can be derived from the content to aid in further analysis. The derived data corresponding to the content can include, for example, data pertaining to the type of content flagged, specifics of the content flagged, characteristics of the content flagged, categories that the content may violate, tolerance levels for the monitored device, addresses to/from which the content was sent, and so on.

At operation 334, the potentially inappropriate content, or portions thereof, and the derived data can be transmitted to the server 440 for further analysis. In some embodiments, the content and the derived data can be encrypted for secure transmission. Server 440, and monitoring device 450 can be provided the appropriate decryption algorithms and decryption keys to decrypt some or all of the content and data for further analysis. In some embodiments, the content itself is encrypted using encryption techniques or encryption keys such that server 440 cannot decrypt the content itself, but can only decrypt other data associated with the content for analysis. Using different levels or forms of encryption can be implemented to protect the privacy of various users of the system by not exposing the content to a third-party server. In this way, server 440 can analyze data to determine an appropriateness level of the content without being permitted access to the content itself.

As illustrated in FIG. 4, server 440 can store the data and the content for further analysis. At operation 336, server 440 analyzes the derived data with a server analysis component to determine whether the content is in fact inappropriate. As noted above, in some implementations the content itself may be secured (e.g., encrypted) such that the server 440 cannot access the content itself, but relies only on derived data. For example, server 440 might not be given the decryption keys or other information or materials necessary to access the security content. In some embodiments, the system can be implemented such that the server 440 can access limited content snippets to make the determination. Securing the content itself from review by server 440, and allowing server 440 to make a determination based on derived data alone (or limited content snippets) can help to preserve the privacy of the users and can also shield server 440 from information it should not have or may not want.

If server 440 determines that the content is not inappropriate, the monitoring continues and an alert need not be sent to monitoring device 450. However, in some implementations, server 440 can be configured to send alerts or updates on a regular basis even if no inappropriate or potentially inappropriate content is detected. Server 440 can also be configured to send regular reports with information such as, for example, the amount and types of content evaluated (e.g., based on the derived data), the results of the analysis and other summary or reporting information. Content received at the server can be stored for predetermined periods of time such that the supervisor can go back and review stored content.

If, on the other hand, server 440 determines that the content is inappropriate (operation 338), server 440 generates an alert and sends the alert to monitoring device 450. This is illustrated at operation 340. Server 440 can send the associated content to monitoring device 450, or monitoring device 450 can retrieve the data from server 440. The content can be decrypted if necessary and reviewed by the supervisor. Where monitoring device 450 and monitored device 430 are the same device, the inappropriate content need not be delivered to the monitoring device 450 as it is already there. In such implementations, server 440 can simply send an identification to monitoring device 450 identifying the content items to be reviewed.

The monitoring operation can continue while a supervisor at monitoring device 450 reviews the relevant content. As noted above, tolerance levels for the monitored device can be sent to server 440 as part of the derived data so that server 440 can conduct the analysis based on the device tolerance settings. Tolerance levels can also be stored at the server for the monitored devices.

Monitoring device 450 can decrypt the content if necessary so that the supervisor can view the content to see what the supervisee is viewing or creating on monitored device 430. At operation 342, the supervisor can generate feedback regarding the content and its appropriateness and send its feedback to server 440 or monitored device 430 or both for updating the algorithms used to analyze the content. For example, the supervisor may indicate through the feedback that the flagged content is not really inappropriate. Machine learning and neural network techniques can be used for the analysis process and this feedback can be used by the machine learning algorithms to refine the analysis (e.g., to further train the neural network) or update the threshold levels.

As illustrated by flowline 344, the operation continues with content on the monitored device being monitored and analyzed for potential inappropriateness. In various implementations, monitoring and analysis can be continuing and ongoing in real time or near real time as the device is operating and receiving content from external sources or as content is generated by user. In further implementations, the monitoring analysis can be performed on stored content that was collected during operation, such as in non-real-time. In some implementations, monitoring can be enabled and disabled by the user (e.g., by the supervisor) manually so that monitoring can be switched on and off on demand.

In some embodiments, the system can be configured to monitor every communication and every item of content received by or entered into the device. In other embodiments, the system can be configured such that only selected types of content or content from selected sources are monitored. For example, the system can be configured to monitor only email correspondence; or to monitor only email, SMS and MMS correspondence; or to monitor only video and still image content; and so on. This selective monitoring by content type (e.g., type of content item or source of content items) can be established by the system, or by the user. For example, a supervisor setting up monitoring for a monitored device may be given the opportunity to designate the types of content monitored for that device. As a further example, a parent setting up monitoring for his or her child's tablet may desire to monitor all types of content from all sources, whereas an employer setting up monitoring for a senior-level employee's computer might choose to monitor only selected types of content or selected content sources.

Implementations can also be configured in which periodic monitoring or spot checking of content can be made, as opposed to continuous, full-time monitoring. For example, the monitoring can be set up so that the specified content items and sources are monitored and analyzed at determined intervals of time or for determined levels of data. For example, the system can be configured to check various content at different intervals. As a further example, the system can be configured to check one in 10 or 20 emails, one out of every 5 or 10 videos, 1 out of every 5 text messages, and so on. As another example, the system can be configured to check various content items at given time intervals. The monitoring periodicity does not have to be uniform as the above examples suggest. Monitoring intervals or times can also be set as random times or nonuniform monitoring intervals.

As these examples illustrate, different levels of periodic or spot check monitoring can be performed such that the system is not required to monitor each and every communication or content item that crosses the monitored device. In some embodiments, the level of monitoring can be user controlled such that the supervisor, for example, can establish the frequency of monitoring of the content items. In further embodiments, the user (e.g., supervisor) can choose different monitoring frequencies for different content items or different communication channels on the device. As noted above, embodiments can also be implemented in which the user can turn monitoring on and off manually (e.g., for on-demand monitoring).

In further embodiments, the system can be implemented such that if inappropriate content is detected (e.g., through analysis by the monitored device, analysis by the server, or analysis and feedback from the monitoring device) the level of monitoring is increased automatically. In some implementations, the level of monitoring can be increased across the board for all content types (e.g. types of content and content sources) being monitored. In other implementations, the level of monitoring can be increased for the content sources or content types corresponding to the inappropriate content identified. Likewise, the system can be configured such that if a determined amount of time lapses or volume of content is monitored without detecting inappropriate content, the monitoring frequency can be decreased. Again, this can be configured to occur automatically or based on user input.

Figure 5:
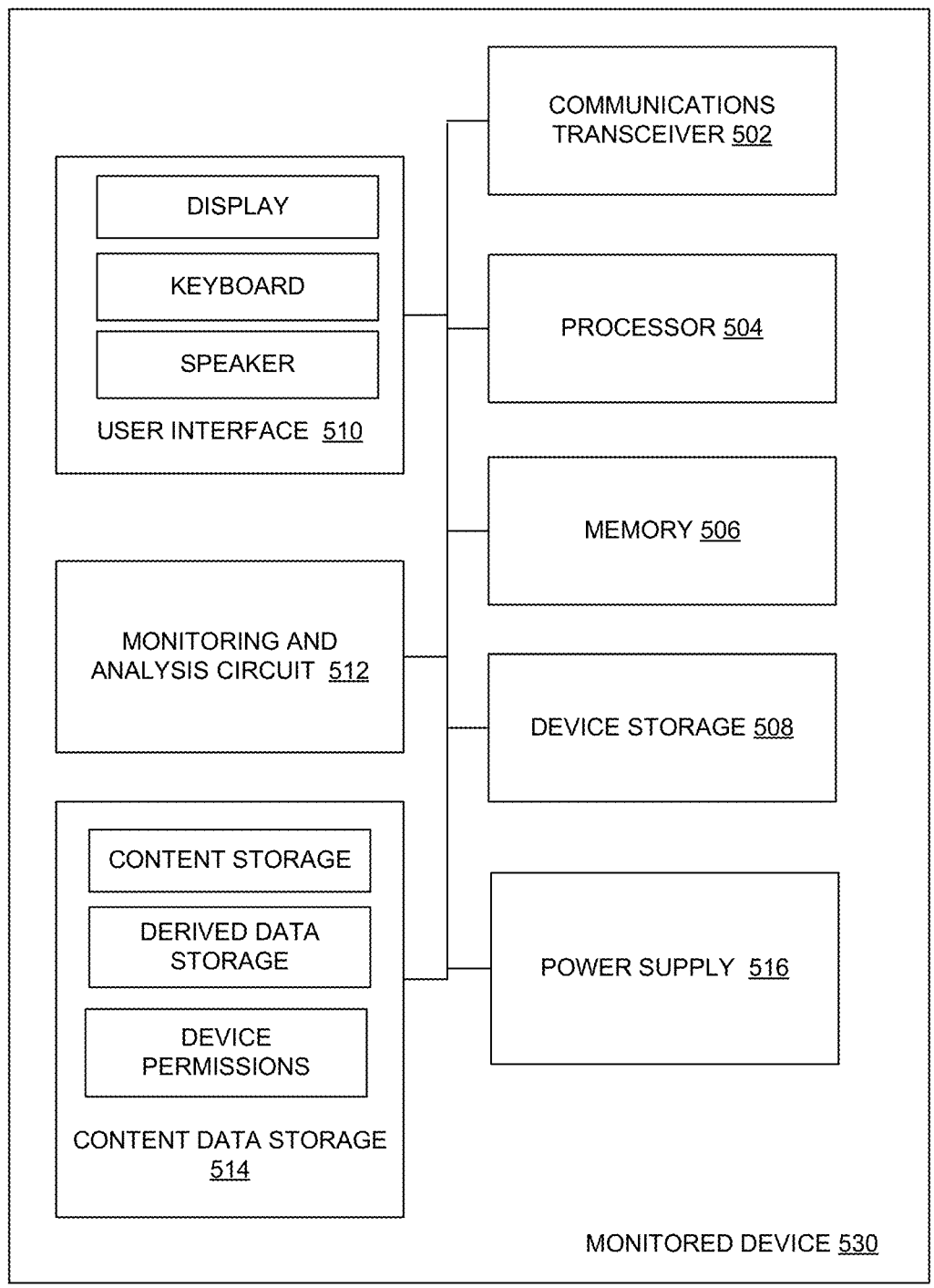
FIG. 5 is a diagram illustrating an example implementation of a monitored device in accordance with one embodiment.

FIG. 5 is a diagram illustrating an example implementation of a monitored device in accordance with one embodiment. In the example illustrated in FIG. 5, monitored device 530 includes communications transceiver 502, processor 504, memory 506, device storage 508, user interface 510, monitoring and analysis circuit 512, content data storage device 514, and power supply 516.

One or more communications transceivers 502 can be included with monitored device 530 for wired or wireless communications interfaces such as, for example, Wi-Fi, Bluetooth, ethernet, USB, cellular, cellular data, and other communications interfaces. In various applications, it is anticipated that communications transceivers 502 would include one or more transmitters and receivers to provide bidirectional communications between monitored device 530 and other devices. In other applications, monitored device 530 can include just a transmitter or just a receiver for one-way communications. Communications transceivers 502 can transmit and receive content that is monitored on a monitored device 530. Communications transceivers 502 can also transmit and receive other content and other data and information. Although not illustrated in the example of FIG. 5, the monitored device may also include one or more antennas for wireless communications or ports/connectors for wired communications.

Processor 504 and memory 506 can be provided to perform traditional functions of monitored device 530. For example, processor 504 can be included to control the operations of monitored device 530 and to execute applications and other instructions on monitored device 530. Processor 504 can be implemented as one or more single- or multi-core processors, CPUs, DSPs, or other processor units, and may be configured to execute instructions to execute applications and otherwise carry out the functions of monitored device 530. For example, messaging applications or instructions therefore can be stored in memory 506 and used by processor 504 to conduct messaging operations.

Memory 506, can be made up of one or more modules of one or more different types of memory, and in the illustrated example is configured to store data and other information as well as operational instructions that may be used by the processor 504 to operate monitored device 530. Likewise, device storage 508 can be made up of one or more modules of one or more different types of memory. Device storage 508 may be used, for example, to store content, applications, or other data and information in conjunction with the operation of monitored device 530. For example, device storage 508 may include built-in memory or a memory card slot (e.g., microSD) to store apps, photographs, videos, or other materials on monitored device 530.

Although not illustrated, monitored device 530 may also include other functional components such as a camera, for example. Still or video images captured by the camera can be included in the content monitored by monitoring and analysis circuit 512.

User interface 510 can provide an I/O interface for user interaction with monitored device 530. In the illustrated example, user interface 510 includes a display to display text, graphics, video, or other information to the user, a keyboard to accept user input, and a speaker for audio output. In some embodiments, user interface 510 can be a touchscreen user interface that provides a display and a touchscreen keyboard interface. Buttons, knobs, dials, or other user inputs can also be included. The speaker can be implemented to include one or more audio speakers or other audio emitters to provide audio content to the user. Although not illustrated, a microphone or other speech transducer can be included to accept audio input from the user.

Monitoring and analysis circuit 512 can be included to provide monitoring and analysis of various content items to determine the appropriateness of the content in accordance with one or more content level settings. Monitoring and analysis circuit 512 can be implemented using a processor and memory (e.g., like processor 504 and memory 506), as dedicated circuitry (e.g. ASIC, FPGA or other circuitry), or a combination of the foregoing. In some embodiments, the functions of monitoring and analysis circuit 512 can be performed using shared resources of monitored device 530, or monitoring and analysis circuit 512 can be dedicated resources for the monitoring and analysis functions. For example, the functions of monitoring and analysis circuit 512 can be performed by an application executing on processor 504, whereas in other embodiments, monitoring and analysis circuit 512 can be separate from processor 504.

In some implementations, monitoring and analysis circuit 512 can include a neural network operating on one or more processors and trained to detect various forms of inappropriate content. For example, a neural network can be initially trained using a variety of content items already identified as appropriate or inappropriate in the trained net installed on the device. The training set of content items can be fed to the neural network with the results so that the neural network can trained with an initial data set. A trained model can be used for a given application, or it can be propagated across multiple applications. Similarly, different models can be trained and these different models propagated to different devices or different classes of devices. For example, models can be trained with different tolerance levels or to look for different classes of inappropriate content.

When feedback is provided (e.g. by a supervisor), this feedback can be used to further refine the training of the neural network. For example, the neural network may flag as inappropriate images similar to those with which it was trained. Where the supervisor feedback indicates that these flagged images are inappropriate, that can reinforce the training. Where the supervisor indicates that the flagged images are not inappropriate, the neural network can be refined to discriminate those images. This process of updating and refining the training can continue for a period of time or throughout the life of the device and can further define what constitutes inappropriate content in accordance with the user's (e.g. the system trainer's or supervisor's) threshold.

The system can be configured such that the output of the neural network is a confidence score. For example, the neural network may be configured to conclude or to output a result indicating that particular content is inappropriate with an X % confidence level. Where the confidence level exceeds a predetermined threshold percentage (e.g. a threshold set based on the supervisor's level of tolerance for content), this can indicate that the content is inappropriate. Where the confidence level does not exceed that threshold, this can indicate that the content is not inappropriate.

In some embodiments, monitoring and analysis can also be performed on a device separate from the monitored device. For example, some or all of the functions of monitoring and analysis circuit 512 can be performed on a router with which the device is connected. For example, tools on the router that enable viewing and analysis of HTTP, HTTPS, HTTP/2 and enabled TCP port traffic accessed from, to, or via the monitored device can be used to perform these functions whether at the device itself or at the router.

Content data storage device 514 can be provided to store one or more of content items flagged by monitoring and analysis circuit 512 as potentially inappropriate, derived data associated with the flag content, and device tolerance levels for the monitored device. Content storage device 514 can occupy an allocated or shared portion of memory 506 or device storage 508, or it can be a storage device separately provided for this content storage. Device tolerance levels stored in content data storage device 514 can include, for example, the monitoring level or scrutiny level established for the monitored device 530.

An encryption circuit can also be included to encrypt content and derive data transmitted to the server for further analysis. As noted above, different levels or types of encryption or different encryption keys can be used for different content items to provide different levels of access for access by the server and the monitoring device. In some embodiments, the encryption can be performed by monitoring and analysis circuit 512, processor 504, communications transceiver 502 or other circuitry in monitored device 530.

Power supply 516 can include any of a number of power sources used to provide electrical power to monitored device 530 and its various components. Power supply 516 can be implemented, for example, as a battery (rechargeable or otherwise), a capacitor or capacitive storage device, an AC-to-DC or DC-to-DC power converter, photovoltaic cells, or a combination of one or more of the foregoing.

Figure 6:
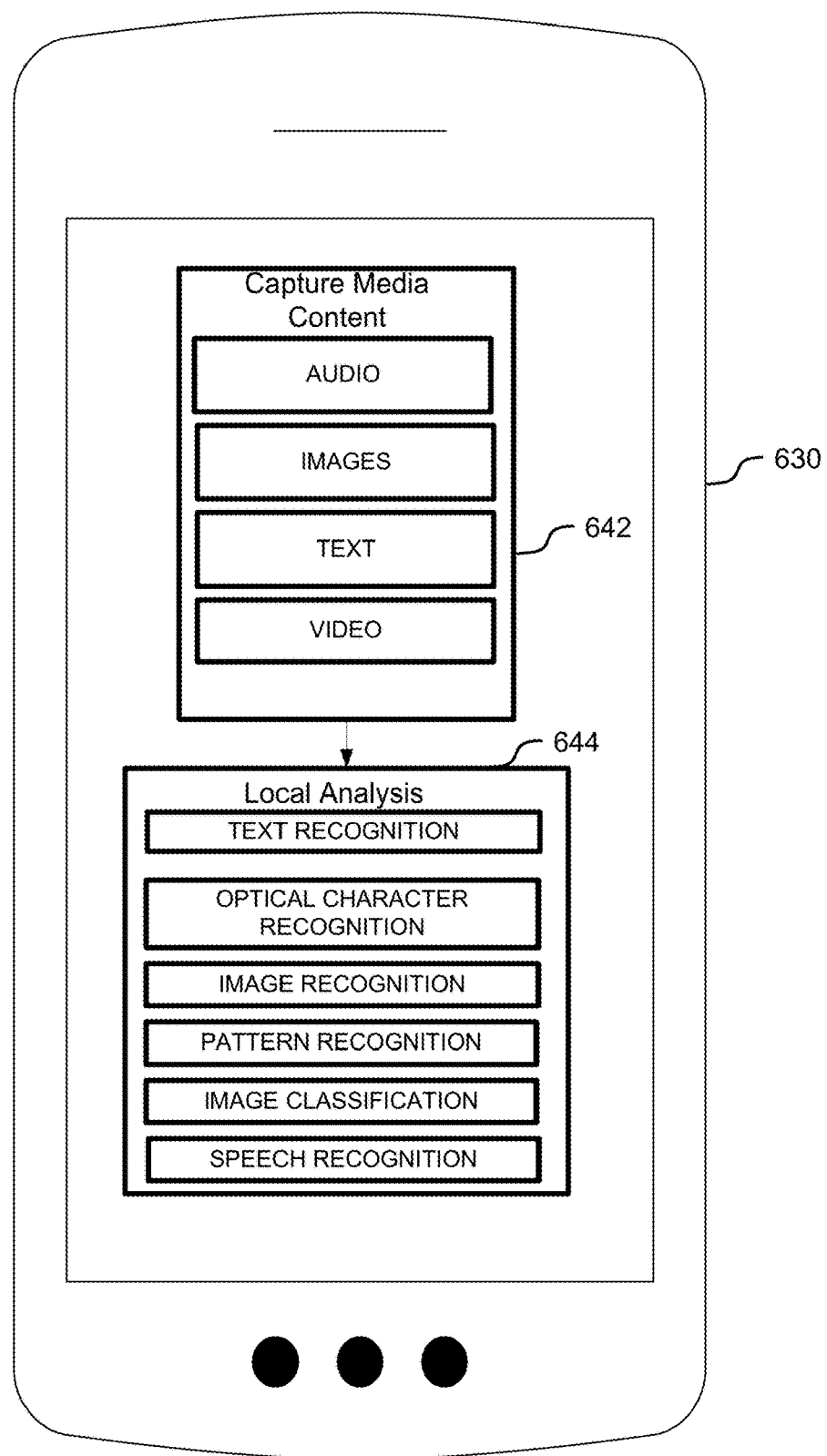
FIG. 6 is a diagram illustrating an example of content capture analysis for a monitored device in accordance with one embodiment.

FIG. 6 is a diagram illustrating an example of content capture analysis for a monitored device in accordance with one embodiment. In this example, monitored device 630 is a handheld device, although monitored device 630 can be any of a number of electronic content devices. In this example, the types of media content captured include audio, still images, speech or text, and video images. Local analysis block 644 includes circuits to analyze the captured media content including circuits for one or more functions such, as for example, text recognition, optical character recognition, image recognition, pattern recognition, and speech recognition. In terms of the example illustrated in FIG. 5, these can be part of monitoring and analysis circuit 512, for example. The device can also include circuitry to analyze a recognized content items to determine whether the content is potentially inappropriate.

Figure 7:
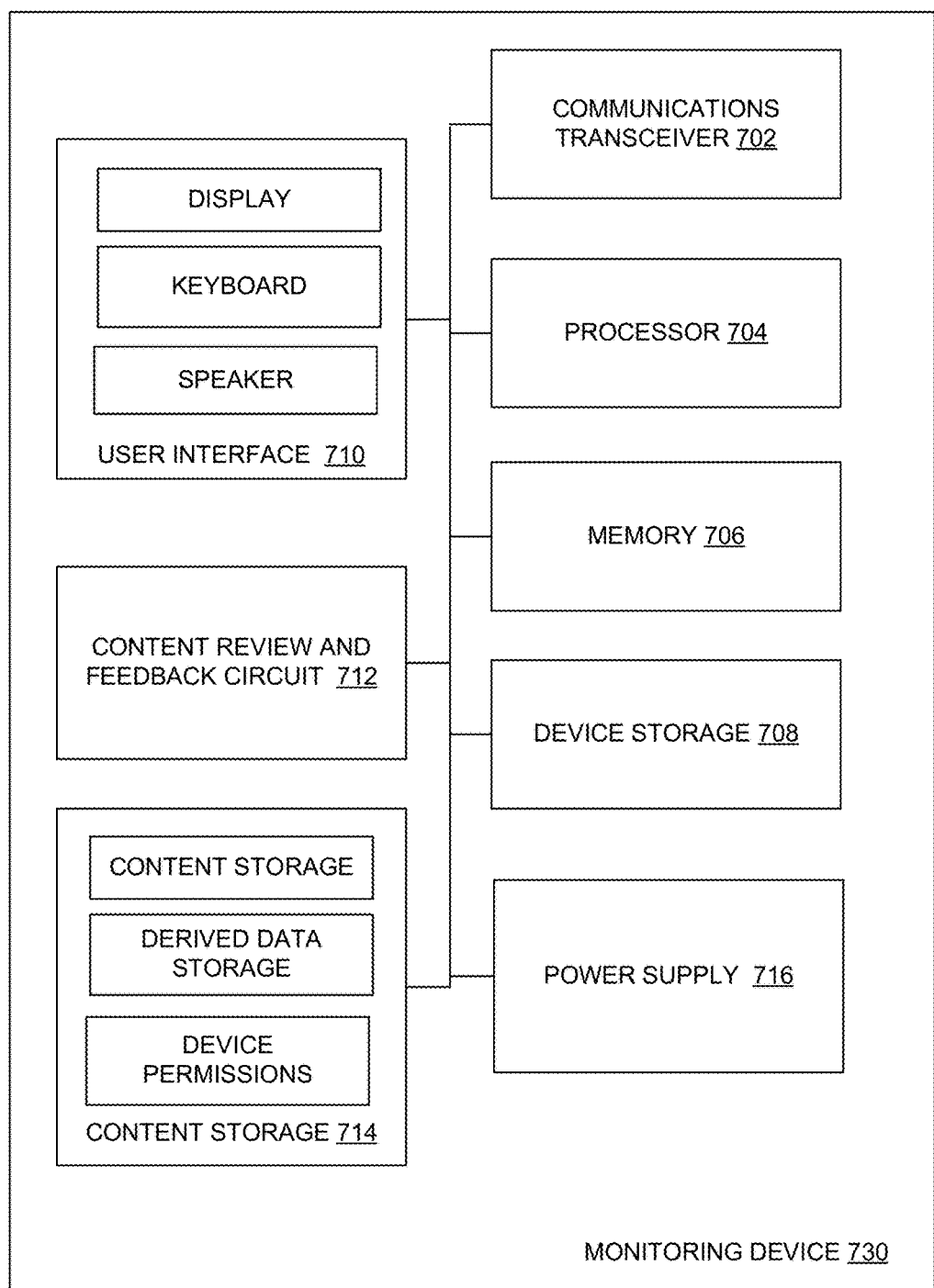
FIG. 7 is a diagram illustrating an example implementation of a monitoring device in accordance with one embodiment.

FIG. 7 is a diagram illustrating an example implementation of a monitoring device in accordance with one embodiment. In the example illustrated in FIG. 7, monitoring device 730 includes communication transceiver 702, processor 704, memory 706, device storage 708, user interface 710, content review and feedback circuit 712, content storage 714, and power supply 716.

With the exception of content review and feedback circuit 712, the illustrated components of monitoring device 730 in this example of FIG. 7 can be implemented similar to the like numbered components of monitored device 530 in FIG. 5.

Content review and feedback circuit 712 can be included to provide content to the supervisor for monitoring device 730 so that the supervisor can review the content and determine whether the content is appropriate in accordance with his or her views of the desired level of appropriateness of the content. Accordingly, content review and feedback circuit 712 can provide the content to the supervisor via a user interface 710. Content review and feedback circuit 712 can be implemented using a processor and memory (e.g., like processor 704 and memory 706), as dedicated circuitry (e.g. ASIC, FPGA or other circuitry), or a combination of the foregoing. In some embodiments, the functions of content review and feedback circuit 712 can be performed using shared resources of monitoring device 730, or content review and feedback circuit 712 can be dedicated resources for the monitoring and analysis functions. For example, the functions of content review and feedback circuit 712 can be performed by an application executing on processor 704, whereas in other embodiments, content review and feedback circuit 712 can be separate from processor 704.

Content review and feedback circuit 712 can also accept input from the supervisor regarding the supervisor's opinion of the appropriateness of the flag content. For example, the supervisor can enter input agreeing that the content is inappropriate, or disagreeing and instead indicating that the content is appropriate or okay for the supervisee. In various embodiments, the system can also accept reasons why the content is appropriate or inappropriate such that the machine learning algorithms used to identify and flag potentially inappropriate content at the monitored device can be updated in accordance with the supervisor's opinions of appropriateness. The supervisors input can be made using user interface 710 such as, for example, by touch screen or keypad input, by speech input, or otherwise. Menus or other display interfaces can be provided to the supervisor to facilitate review and feedback. Generated feedback can be sent to the server and the monitored device such as by communication transceiver 702.

Content review and feedback circuit 712 can also retrieve the flagged content that is stored on the server so that the flag content can be displayed or otherwise presented to supervisor for review via the user interface 710. Although not illustrated, appropriate encryption and decryption algorithms can be used to safeguard the transfer of content and feedback.

Figure 8:
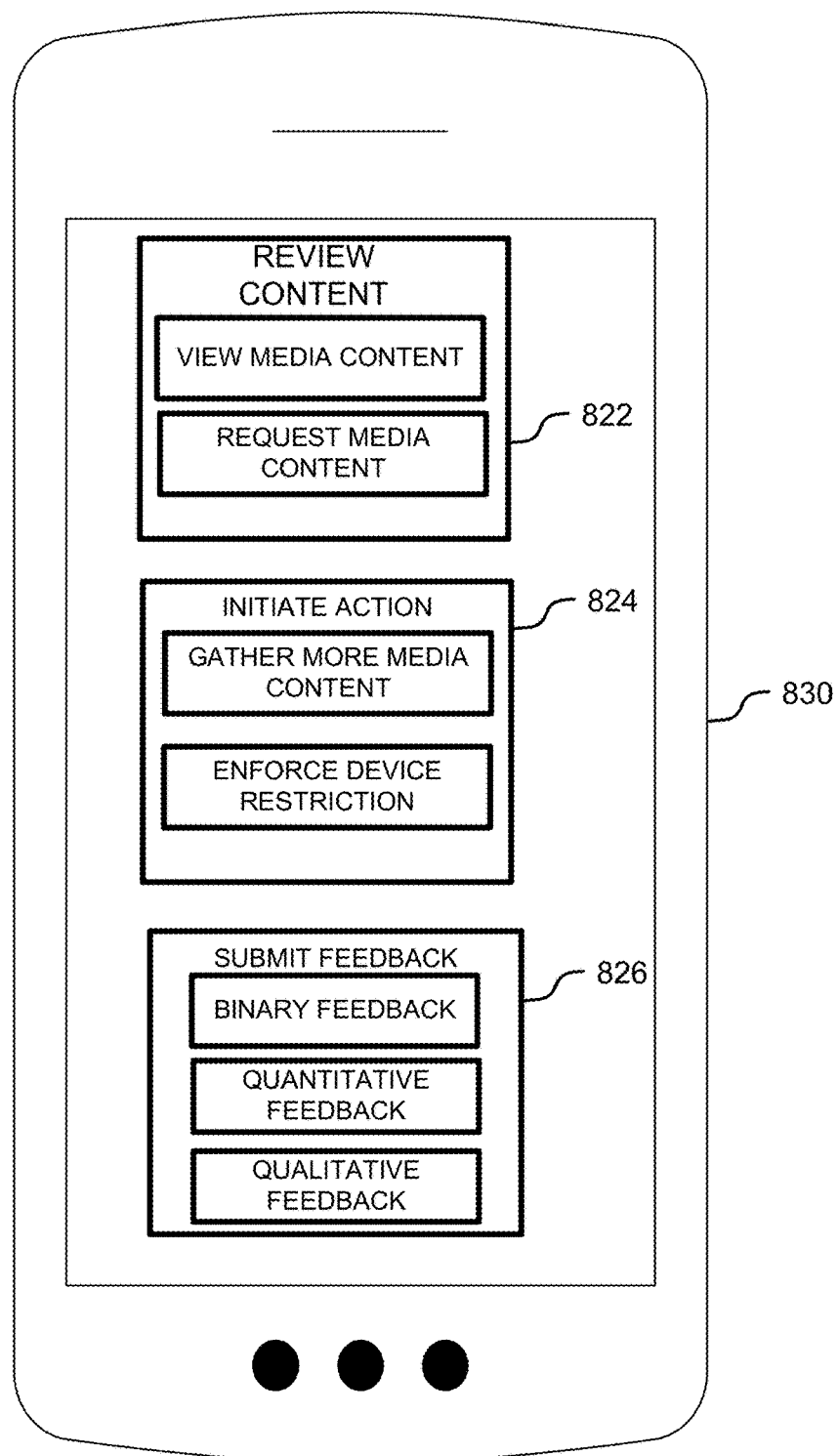
FIG. 8 is a diagram illustrating an example of captured content review and feedback by a monitoring device in accordance with one embodiment.

FIG. 8 is a diagram illustrating an example of captured content review and feedback by a monitoring device in accordance with one embodiment. In this example, monitoring device 830 is a handheld device, although monitoring device 830 can be any of a number of electronic content devices. In this example, content review 822 (e.g., by content review and feedback circuit 712) can present the content of the supervisor so the supervisor can view the flagged media content for review and comment. Content review 822 can also allow the supervisor to request media content for review. In some embodiments, the server can send an alert to the monitoring device that content is available for monitoring. This, in turn, can trigger a notification to the supervisor that there is content to be reviewed. It is noted that the supervisor need not wait to receive a notification, but can also initiate review by checking status of alerts received by the monitoring device from the server, or by accessing the server from the monitoring device to determine whether there are additional content items ready to review.

The initiate action block 824 (e.g., by content review and feedback circuit 712) can allow supervisor, or the device itself, to request more content be gathered for the particular analysis, or to increase the amount of content gathering on a go forward basis. The initiate action block 824 can also be used to enforce restrictions on the monitored device. This can include, for example, shutting down or locking the monitored device, disabling particular applications of the monitored device, blocking content from entering the monitored device, shutting down particular communication channels of the monitored device. The restrictions may also include slowing down or throttling aspects of the monitored device, such as, for example, reducing the processing speed or abilities of the monitored device, slowing down the data throughput of the monitored device, and so on. The restrictions placed on the monitored device may vary based on the tolerance settings of the device or based on the level of inappropriateness of the received content. For example, more serious infractions may lead to more serious consequences on the monitored device.

In some embodiments, the restrictions enforced on the monitored device can be imposed in response to action taken by the supervisor. For example, after reviewing the content the supervisor may determine that it is indeed inappropriate and request that the restrictions be put into place. In other embodiments, the restrictions can be imposed automatically upon the generation of an alert by the server. In such embodiments, the supervisor may lift the restrictions such as, for example, after the supervisor has review the content and determined its level of inappropriateness.

The submit feedback block 826 (e.g., by content review and feedback circuit 712) can be used to allow the supervisor to submit feedback regarding the content reviewed by the supervisor. This can include, for example, binary feedback (e.g. the flagged content is appropriate or inappropriate), quantitative feedback such as the level of inappropriateness of the flagged content reviewed (e.g., on a scale of 1 to 5 or 1 to 10, a rating scale, or other quantitative review), or qualitative feedback (e.g., how the supervisor feels about the appropriateness of the content on a qualitative or descriptive basis, or text input describing the captured content). Some examples of qualitative and quantitative feedback are described below.

Figure 9:
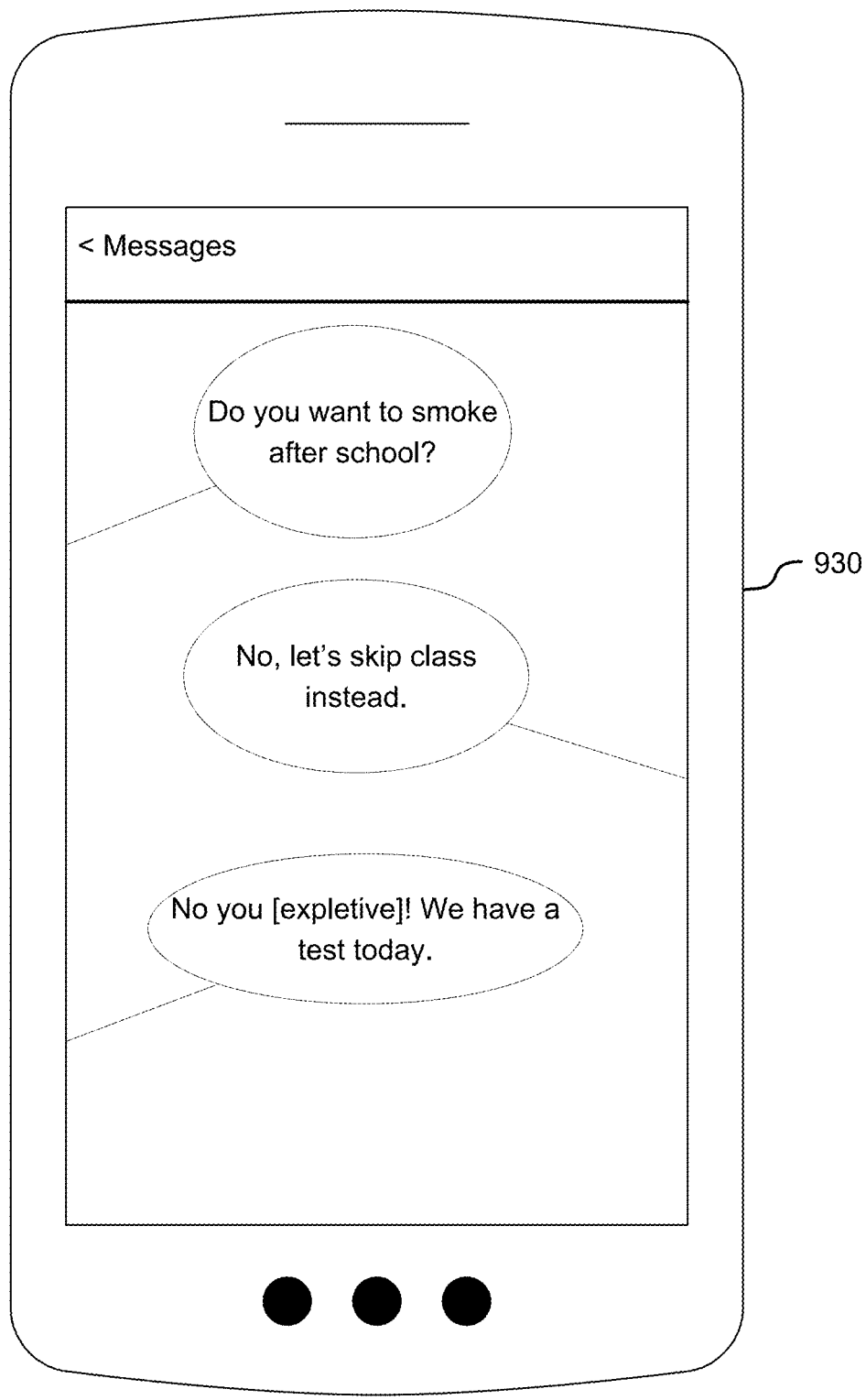
FIG. 9 is an example illustrating a message string that can be monitored at a monitored device for potential inappropriateness.

FIG. 9 is an example illustrating a message string that can be monitored at a monitored device for potential inappropriateness. In this example, a supervisee is using monitored device 932 engage in an SMS conversation with another party. In this example exchange, the supervisee and the other party to the SMS conversation our students in middle school. In this example, the other person asks the supervisee whether she wants to smoke after school. The supervisee responds that she would rather skip class instead, to which the other person replies that they cannot skip class because they have a test.

In various embodiments, text recognition algorithms can be run on the words and phrases in the SMS message string to determine whether any flags are raised indicating potentially inappropriate activity. For example, words like "smoke" or phrases like "skip class" may be set to raise flags for inappropriate content. As another example, the [expletive] may trigger a tolerance level setting relating to profanity. In other examples, vulgar language, sexually explicit language, threatening or bullying language, language pertaining to inappropriate activities, to name a few, may also be set to raise flags for inappropriate content. Further to this example, where the system is set such that the word "smoke" or the phrase "skip class" is set to raise flags for inappropriate content, the content may be flagged as potentially inappropriate, data can be derived from the content to allow further analysis, and the content and derived data sent to the server (or in other embodiments directly to the supervisor or supervisors) for further analysis and review. As noted, the content can be encrypted such that the server cannot access the actual content itself, but the server can still access the derived data to perform further analysis. The content can include a transcript of the SMS message, or screenshots of the SMS message.

The derived data may include, for example, just the inappropriate words that were flagged (e.g., without revealing the entire conversation), date and time information during which the conversation took place, the context in which the inappropriate words arose (e.g., an SMS message), a contact in the messaging application, or other information that would be useful to allow the analysis by the server. This data may also include metadata regarding the analysis and judgments made by the analysis tool as well as weights used in performing the analysis (e.g., for a neural network). As another example, the data can include information such as category of the content, class of the content, and a confidence level in the result of the analysis that took place on the device.

As another example, image recognition and analysis tools may be used to flag inappropriate images such as, for example, nudity, obscene gestures, violence, and so on. In this example, derived data may include data such as, for example, date and time the image was received, and identification of the sender or source of the image, and image classification (e.g., nudity, violence, etc.) or other derived data to allow the server to make a determination without having to access the actual content itself.

Figure 10:
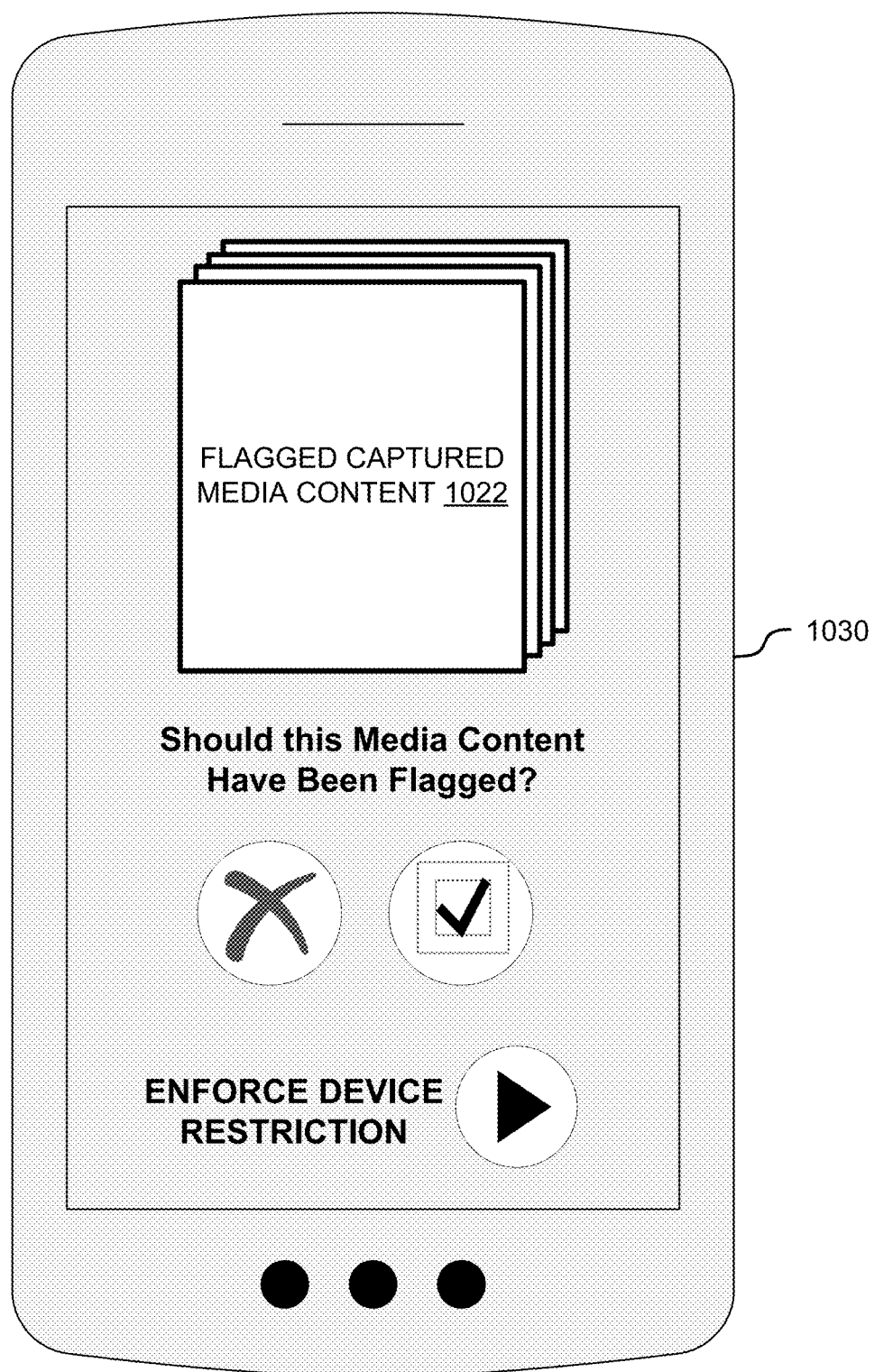
FIG. 10 is a diagram illustrating an example of review and feedback on a monitoring device in accordance with one embodiment.

FIG. 10 is a diagram illustrating an example of review and feedback on a monitoring device in accordance with one embodiment. In this example, a supervisor reviews flagged captured content 1022 on the screen of his or her monitoring device 1030. Also displayed on the device screen is a binary feedback option that allows the supervisor to respond in a yes or no fashion whether the content that he or she reviewed is actually inappropriate content. In this example, the choices are an X to indicate "no" or a checkbox to indicate that "yes" the content is inappropriate. In other implementations, the words "YES" and "NO" can be used, or other symbols and descriptors can be used to present feedback choices to the supervisor. This example also illustrates an input allowing the supervisor to select whether he or she wishes to enforce a device restriction. This example illustrates the selection with an arrow button (similar to a "play" button), however other designations can be used.

Figure 11:
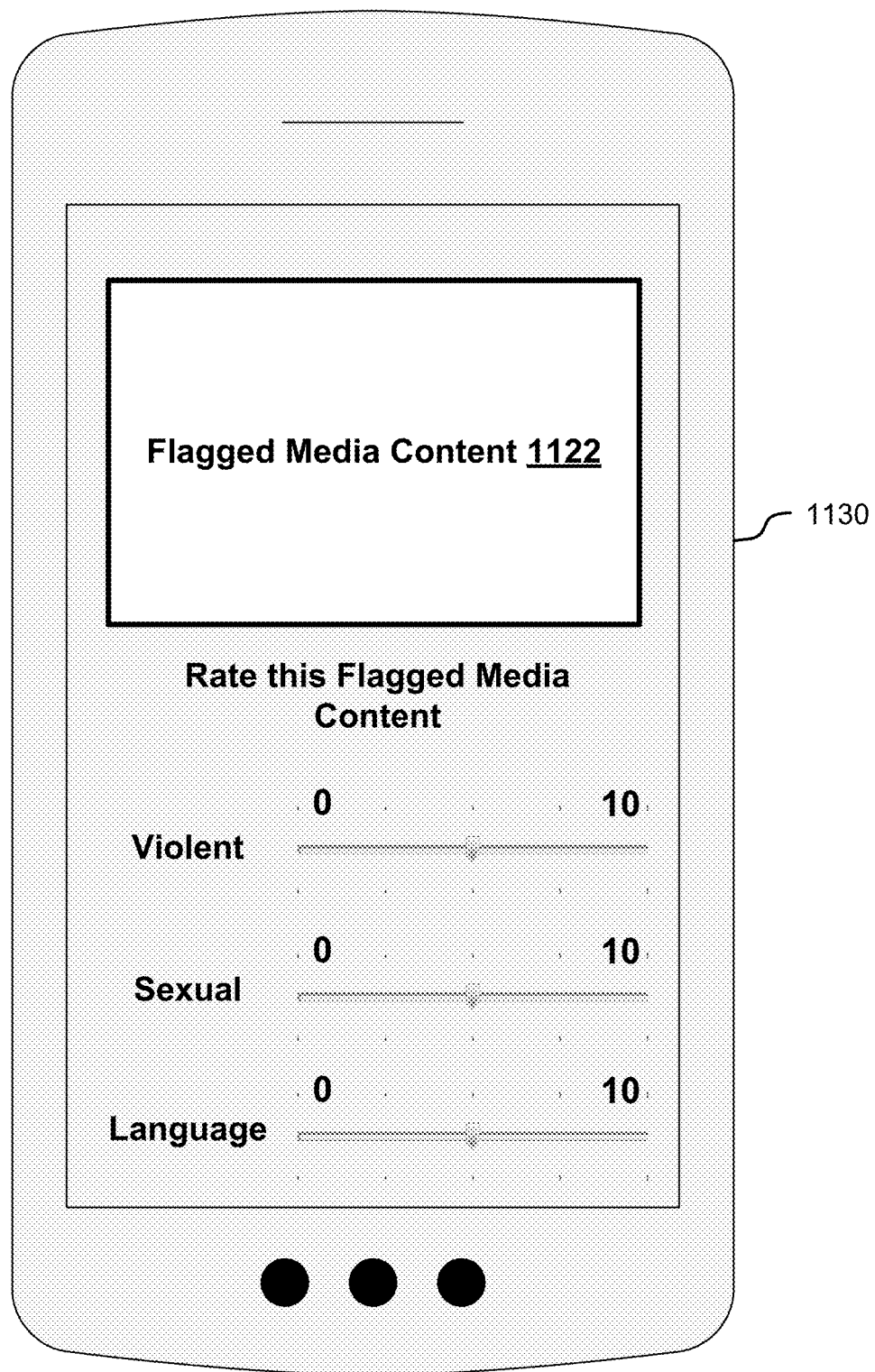
FIG. 11 illustrates another example of review and feedback one a monitoring device in accordance with one embodiment.

FIG. 11 illustrates another example of review and feedback on a monitoring device in accordance with one embodiment. Similar to the prior example, in this example a supervisor reviews flagged captured content 1122 on the screen of his or her monitoring device 1130. However, in this example, the user interface allows the supervisor to enter quantitative feedback regarding the levels of inappropriateness of the reviewed content. More particularly, this example illustrates a user interface that allows the supervisor to enter quantitative feedback for three categories of potentially inappropriate content: violence, sexual content, and language. Accordingly, the supervisor can rate the content differently in each of the three categories and this feedback can be used to refine the analysis algorithms based on the supervisors tolerance for material in these three categories. A machine learning algorithm can accept input from the supervisor over a number of different content items and assimilate that information to refine the settings for the monitored device. For example, feedback indicating that a particular content item was not inappropriate may be used to refine the algorithm used to assess the content. The algorithm may learn over time that particular images are not inappropriate. In some implementations, this can be used to update the algorithm for that supervisor or installation alone, whereas in other implementations this information can be used to refine the algorithm for multiple different users across a plurality of offices, households, etc.

Figure 12:
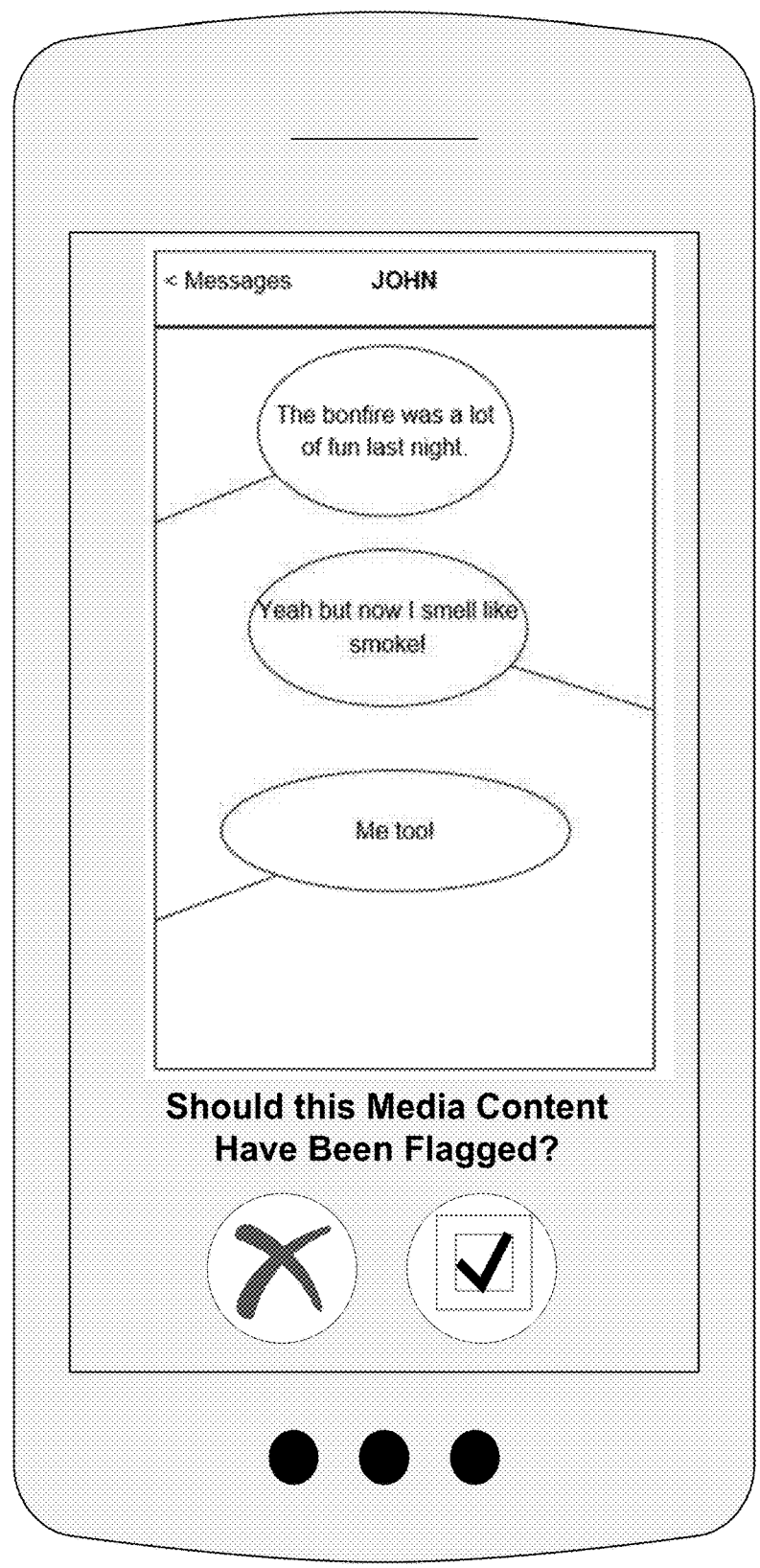
FIG. 12 is a diagram illustrating an example of a false positive in accordance with one embodiment.

FIG. 12 is a diagram illustrating an example of a false positive in accordance with one embodiment. In this example, similar to the example of FIG. 10, the word "smoke" is included in the SMS message string. Also similar to the example of FIG. 10, the presence of this word may trigger a flag for this content, causing the content to be sent to the server for analysis and ultimately to the supervisor for review. However because the context is not smoking cigarettes after school, but is instead referring to a permitted bonfire, the supervisor may flag the content as okay, or not inappropriate. Accordingly, the supervisor may in this instant select the "X" selection on the touch sensitive display screen. Although the system may continue to alert on the term "smoke" it may learn through this feedback that when discussed in the context of a bonfire, for example, the term is not okay. As a further example, if the term "smoke" was flagged over numerous occasions, and each time the supervisor's feedback is that this is not inappropriate, the system can update the settings to no longer generate an alert based on the presence of this term. For example, a supervisor may not care whether the supervisee takes a smoke break.

Figure 13:
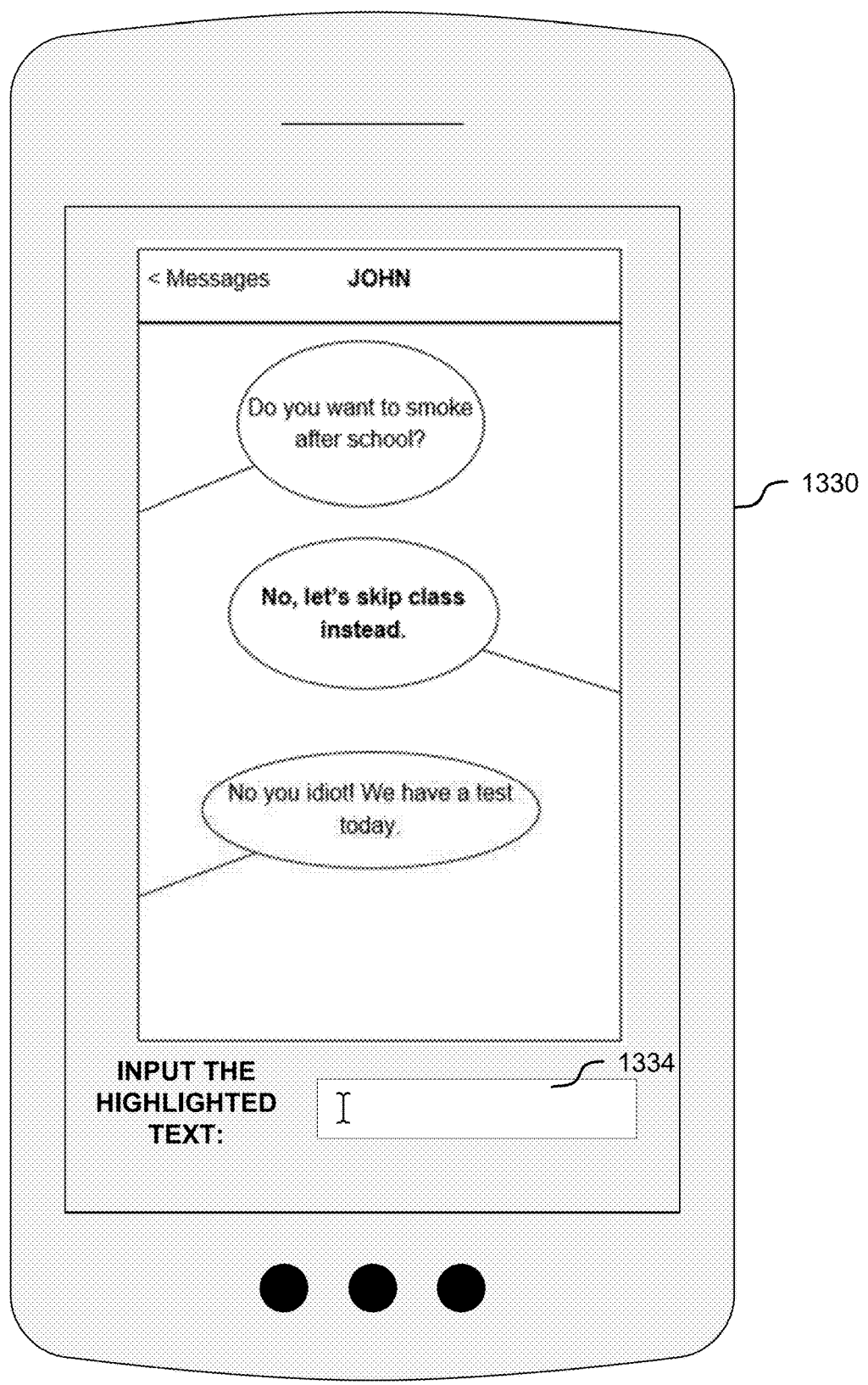
FIG. 13 illustrates yet another example of supervisor feedback in accordance with one embodiment.

FIG. 13 illustrates yet another example of supervisor feedback in accordance with one embodiment. In this example, supervisor operating monitoring device 1330 wishes to add text that was not flagged or wishes to add flag text to further reinforce its importance in the appropriateness determination. Accordingly, the supervisor can select on the user interface to input text that it wishes to either reinforce or flag. In this example, the supervisor may enter "let's skip class" in the input box 1334.

In the examples illustrated above with reference to FIGS. 1-4, and in other embodiments discussed herein, a server may be included to analyze at least the derived data, and in some instances the content, to determine the appropriateness of the flagged content. As noted above, in some embodiments the content can be encrypted such that the server cannot access the content itself, but can only access the derived data for its analysis. In such embodiments, the system may still be implemented such that the server can store the encrypted content for access by the supervisor or supervisors on a monitoring device so that the supervisor could review the content for appropriateness.

In other embodiments, the system can be implemented without a server. In such implementations, the monitored device can monitor and analyze content and send captured content to the monitoring device without interaction or intervention by a server. Such embodiments can be implemented in one-device environments as well as in environments that may include more than one of either or both monitoring device and the monitored device. In one-device environments, the supervisor may log in with different credentials so that he or she can view the inappropriate content that has been flagged and provide feedback to the analysis tool on the device. Where the monitoring and monitored device are separate, the inappropriate content as well as the derived data can be sent directly to the supervised device for further analysis, review and feedback.

Various examples described herein are described in terms of a single monitoring device monitoring a single monitored device. However, in other embodiments, one or more monitoring devices can be used to monitor one or more monitored devices. For example, in some applications one or two managers may wish to monitor the performance of a large number of employees. As another example, either or both parents may want to monitor the performance of one child. As yet another example, either or both parents may want to use multiple devices as monitoring devices to monitor multiple devices used by their child.

Where multiple devices are monitored by a single supervisor or group of supervisors, the same set of content tolerance levels (which may be implemented as thresholds) can be distributed across a plurality of monitored devices. For example where a parent or parents are monitoring multiple devices of a single child or multiple devices across multiple children, the parent or parents can decide to impose the same content tolerance levels across all devices of all children. As another example, the parent or parents may set up one set of tolerance levels for the devices or logins used by a younger child, and a different set of tolerance levels for the devices or logins used by an older child. Similarly, a manager may set up the same level of tolerance levels across all employees in his or her group, or may set up different tolerance levels for different levels of employees in the group. For example, team leaders under the manager may have a different tolerance levels as compared to workers under the team leaders.

Figure 14:
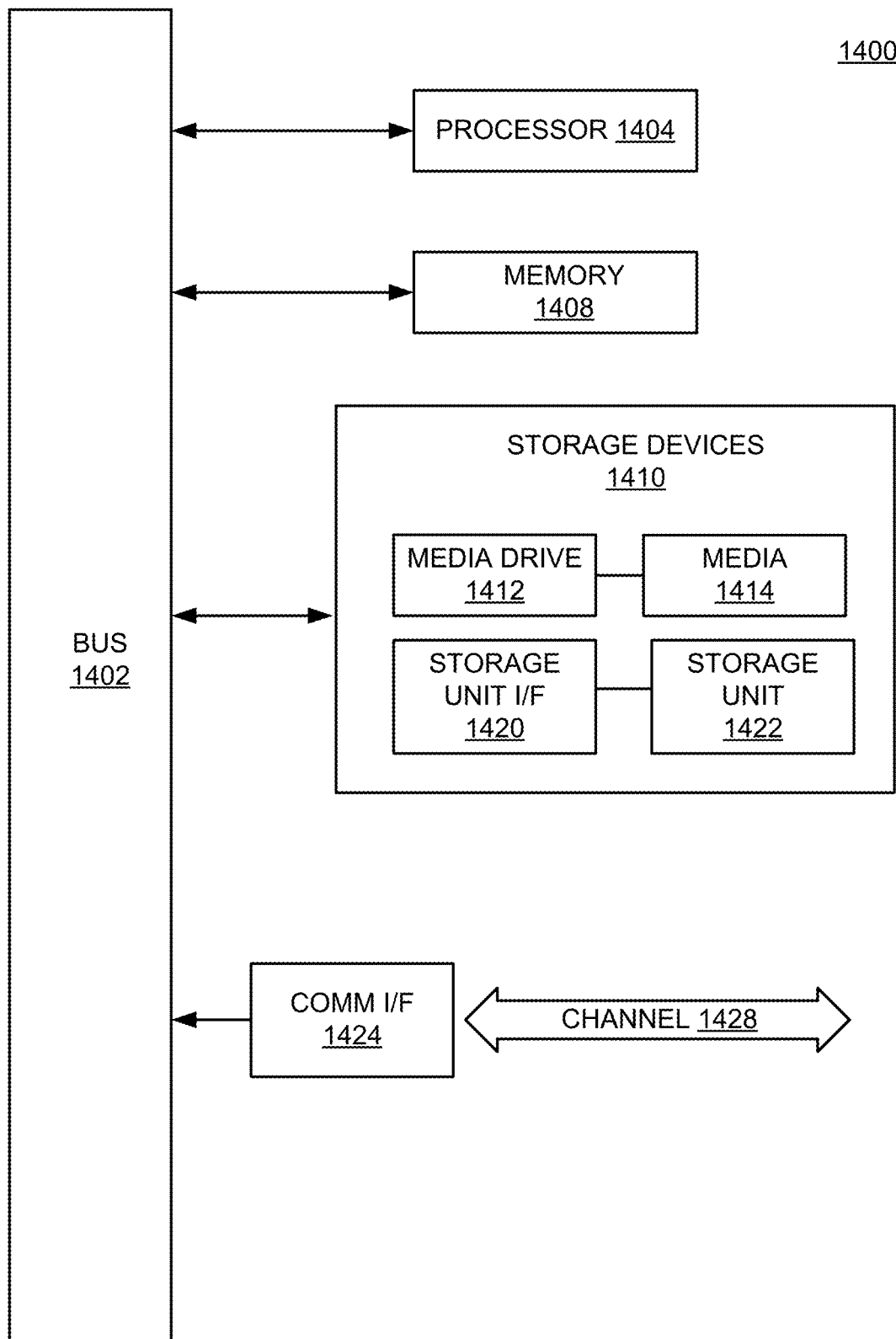
FIG. 14 illustrates an example computing module that may be used in implementing various features of embodiments of the disclosed technology.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. In other words, as would be apparent to one of ordinary skill in the art after reading this description, the various features and functionality described herein may be implemented in any given application and can be implemented in one or more separate or shared circuits in various combinations and permutations. Even though various features or elements of functionality may be individually described or claimed as separate circuits, one of ordinary skill in the art will understand that these features and functionality can be shared among one or more common circuits, and such description shall not require or imply that separate circuits are required to implement such features or functionality.

Where circuits are implemented in whole or in part using software, in one embodiment, these software elements can be implemented to operate with a computing or processing system capable of carrying out the functionality described with respect thereto. One such example computing system is shown in FIG. 14. Various embodiments are described in terms of this example-computing system 1400. After reading this description, it will become apparent to a person skilled in the relevant art how to implement the technology using other computing systems or architectures.

Referring now to FIG. 14, computing system 1400 may represent, for example, computing or processing capabilities found within desktop, laptop and notebook computers; hand-held computing devices (smart phones, cell phones, palmtops, tablets, etc.); mainframes, supercomputers, workstations or servers; or any other type of special-purpose or general-purpose computing devices as may be desirable or appropriate for a given application or environment. Computing system 1400 might also represent computing capabilities embedded within or otherwise available to a given device. For example, a computing system might be found in other electronic devices such as, for example, digital cameras, navigation systems, cellular telephones, portable computing devices, modems, routers, WAPs, terminals and other electronic devices that might include some form of processing capability.

Computing system 1400 might include, for example, one or more processors, controllers, control modules, or other processing devices, such as a processor 1404. Processor 1404 might be implemented using a general-purpose or special-purpose processing engine such as, for example, a microprocessor (whether single-, dual- or multi-core processor), signal processor, graphics processor (e.g., GPU) controller, or other control logic. In the illustrated example, processor 1404 is connected to a bus 1402, although any communication medium can be used to facilitate interaction with other components of computing system 1400 or to communicate externally.

Computing system 1400 might also include one or more memory modules, simply referred to herein as main memory 1408. For example, in some embodiments random access memory (RAM) or other dynamic memory, might be used for storing information and instructions to be executed by processor 1404. Main memory 1408 might also be used for storing temporary variables or other intermediate information during execution of instructions to be executed by processor 1404. Computing system 1400 might likewise include a read only memory ("ROM") or other static storage device coupled to bus 1402 for storing static information and instructions for processor 1404.

The computing system 1400 might also include one or more various forms of information storage mechanism such as storage devices 1410, which might include, for example, a media drive 1412 and a storage unit interface 1420. The media drive 1412 might include a drive or other mechanism to support fixed or removable storage media 1414. For example, a hard disk drive, a floppy disk drive, a magnetic tape drive, an optical disk drive, a CD or DVD drive (R or RW), a flash drive, or other removable or fixed media drive might be provided. Accordingly, storage media 1414 might include, for example, a hard disk, a floppy disk, magnetic tape, cartridge, optical disk, a CD or DVD, or other fixed or removable medium that is read by, written to or accessed by media drive 1412. As these examples illustrate, the storage media 1414 can include a computer usable storage medium having stored therein computer software or data.

In alternative embodiments, information storage devices 1410 might include other similar instrumentalities for allowing computer programs or other instructions or data to be loaded into computing system 1400. Such instrumentalities might include, for example, a fixed or removable storage unit 1422 and an interface 1420. Examples of such storage units 1422 and interfaces 1420 can include a program cartridge and cartridge interface, a removable memory (for example, a flash memory or other removable memory module) and memory slot, a flash drive and associated slot (for example, a USB drive), a PCMCIA slot and card, and other fixed or removable storage units 1422 and interfaces 1420 that allow software and data to be transferred from the storage unit 1422 to computing system 1400. Information storage devices 1410 may also include fixed or removable RAM, ROM, or other memory.

Computing system 1400 might also include a communications interface 1424. Communications interface 1424 might be used to allow software and data to be transferred between computing system 1400 and external devices. Examples of communications interface 1424 might include a modem or softmodem, a network interface (such as an Ethernet, network interface card, WiMedia, IEEE 802.XX, Bluetooth® or other interface), a communications port (such as for example, a USB port, IR port, RS232 port, or other port), or other communications interface. Software and data transferred via communications interface 1424 might typically be carried on signals, which can be electronic, electromagnetic (which includes optical) or other signals capable of being exchanged by a given communications interface 1424. These signals might be provided to communications interface 1424 via a channel 1428. This channel 1428 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 1408, storage unit 1420, media 1414, and channel 1428. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing system 1400 to perform features or functions of the disclosed technology as discussed herein.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that can be included in the disclosed technology. The disclosed technology is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the technology disclosed herein. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for device monitoring, comprising:
a non-transitory machine-readable storage medium comprising instructions executable by one or more processing units that, when executed, cause the system to:
receive, from a monitored user device, derived data corresponding to flagged media content detected by the monitored user device;
analyze the derived data to determine if the flagged media content corresponding to the derived data exceeds one or more media content tolerance levels associated with the monitored device; and
transmit an alert to a second user device if the flagged media content is determined to exceed one or more media content tolerance levels.

2. The system of claim 1, wherein monitored media content comprises a screen capture of the monitored user device screen.

3. The system of claim 1, wherein monitored media content comprises one or more of: audio output on the monitored user device, extracted text, and manually inputted text.

4. The system of claim 1, wherein the instructions, when executed by the one or more processing units, further cause the system to receive media content from the monitored user device corresponding to the flagged media content.

5. The system of claim 4, wherein the monitored device encrypts the media content prior to transmitting it to the server, such that the server is able to analyze data corresponding to the media content without accessing to the media content.

6. The system of claim 1, wherein the alert comprises flagged media content determined to exceed a media content tolerance level, such that the second user device is able to view the flagged media content.

7. The system of claim 6, wherein the instructions, when executed by the one or more processing units, further cause the system to receive, from the second user device, feedback comprising an indication as to whether the flagged media content constitutes inappropriate material according to standards of the user.

8. The system of claim 7, wherein the feedback comprises an indication as to whether the flagged media content should have been flagged.

9. The system of claim 7, wherein the feedback comprises an indication describing the flagged media content, wherein the indication is received from the second user device and comprising one or more of: a textual input describing characteristics of the captured media content; a rating of flagged media content; and a textual input reciting text information contained in the captured media content.

10. The system of claim 9, wherein the rating corresponds to one or more of violence, sexual content, or language.

11. A method for device monitoring, the method comprising the steps of:
receiving, from a monitored user device, derived data corresponding to flagged media content detected by the monitored user device;
analyzing the derived data to determine if the flagged media content corresponding to the derived data exceeds one or more media content tolerance levels associated with the monitored device; and
transmitting an alert to a second user device if the flagged media content is determined to exceed one or more media content tolerance levels.

12. The method of claim 11, wherein monitored media content comprises a screen capture of the monitored user device screen.

13. The method of claim 11, wherein monitored media content comprises one or more of: audio output on the monitored user device, extracted text, and manually inputted text.

14. The method of claim 11, further comprising receiving media content from the monitored user device corresponding to the flagged media content.

15. The method of claim 14, wherein the monitored device encrypts the media content prior to transmitting it to the server, such that the server is able to analyze data corresponding to the media content without accessing to the media content.

16. The method of claim 11, wherein the alert comprises flagged media content determined to exceed a media content tolerance level, such that the second user device is able to view the flagged media content.

17. The method of claim 16, further comprising receiving, from the second user device, feedback comprising an indication as to whether the flagged media content constitutes inappropriate material according to standards of the user.

18. The method of claim 17, wherein the feedback comprises an indication as to whether the flagged media content should have been flagged.

19. The method of claim 17, wherein the feedback comprises an indication describing the flagged media content, wherein the indication is received from the second user device and comprising one or more of: a textual input describing characteristics of the captured media content; a rating of flagged media content; a textual input reciting text information contained in the captured media content.

20. The system of claim 19, wherein the rating corresponds to one or more of violence, sexual content, or language.

* * * * *